(12) United States Patent
Hishinuma et al.

(10) Patent No.: US 12,422,894 B2
(45) Date of Patent: Sep. 23, 2025

(54) STRETCHABLE DEVICE

(71) Applicant: Magnolia White Corporation, Tokyo (JP)

(72) Inventors: Masatomo Hishinuma, Tokyo (JP); Hiroumi Kinjo, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 159 days.

(21) Appl. No.: 18/214,673

(22) Filed: Jun. 27, 2023

(65) Prior Publication Data

US 2024/0019902 A1 Jan. 18, 2024

(30) Foreign Application Priority Data

Jul. 12, 2022 (JP) ................................. 2022-111992

(51) Int. Cl.
*G06F 1/16* (2006.01)

(52) U.S. Cl.
CPC .......... *G06F 1/1652* (2013.01); *G06F 1/1681* (2013.01)

(58) Field of Classification Search
CPC .... G06F 1/1652; G06F 1/1681; G06F 1/1643; G06F 1/1658; G06F 1/1637; G09F 9/301
See application file for complete search history.

(56) References Cited

U.S. PATENT DOCUMENTS

| 9,569,018 | B2 * | 2/2017 | Kang | ......................... | G06F 3/03 |
| 11,011,599 | B2 * | 5/2021 | Kim | ..................... | H10K 77/111 |
| 11,037,478 | B2 * | 6/2021 | Ahn | ...................... | H10K 77/111 |
| 11,069,268 | B2 * | 7/2021 | Niu | ........................ | H10K 59/131 |
| 11,271,179 | B2 * | 3/2022 | Kim | ........................ | H10K 50/82 |
| 11,765,821 | B2 * | 9/2023 | Sano | .................... | H05K 1/0296 |
|  |  |  |  |  | 174/251 |
| 12,033,544 | B2 * | 7/2024 | Kim | ........................ | G06F 1/1652 |
| 12,079,041 | B2 * | 9/2024 | Hong | ..................... | G06F 3/0412 |
| 12,169,618 | B2 * | 12/2024 | Sano | ..................... | G06F 3/0446 |
| 12,191,425 | B2 * | 1/2025 | Yang | ................... | H01L 25/0753 |
| 12,230,645 | B2 * | 2/2025 | Pan | ....................... | H10D 86/443 |
| 2015/0282296 | A1 * | 10/2015 | Ogura | .................... | H05K 1/038 |
|  |  |  |  |  | 29/850 |

(Continued)

FOREIGN PATENT DOCUMENTS

| JP | 2019-174373 A | 10/2019 |
| JP | 2021-118273 A | 8/2021 |

*Primary Examiner* — Rockshana D Chowdhury
(74) *Attorney, Agent, or Firm* — K&L Gates LLP

(57) ABSTRACT

According to an aspect, a stretchable device includes: a resin base member; and an array layer stacked on the resin base member. The resin base member includes: bodies separated from each other; and hinges that couple the bodies. Each hinge includes bends. Each bend is divided into an inner peripheral portion positioned on an inner side and an outer peripheral portion positioned on an outer side with respect to a center serving as a boundary in a width direction intersecting a direction in which the bend extends. The inner peripheral portions included in one of the hinges constitute an inner peripheral region. The outer peripheral portions included in one of the hinges constitute an outer peripheral region. The array layer includes gauge lines overlapping the respective hinges. At least part of each gauge line overlaps one of the inner peripheral region and the outer peripheral region alone.

6 Claims, 26 Drawing Sheets

(56) References Cited

U.S. PATENT DOCUMENTS

| | | | |
|---|---|---|---|
| 2016/0093685 A1* | 3/2016 | Kwon | H10K 59/8793 |
| | | | 257/40 |
| 2016/0104756 A1* | 4/2016 | Lee | H10K 59/353 |
| | | | 257/40 |
| 2016/0111481 A1* | 4/2016 | Jeong | H10K 59/131 |
| | | | 257/40 |
| 2016/0320878 A1* | 11/2016 | Hong | G09G 3/3233 |
| 2017/0110529 A1* | 4/2017 | Zhang | H10K 59/873 |
| 2017/0181277 A1* | 6/2017 | Tomita | H05K 1/038 |
| 2019/0306972 A1 | 10/2019 | Baba | |
| 2021/0234108 A1 | 7/2021 | Sano | |
| 2021/0264837 A1* | 8/2021 | Ahn | G09G 3/20 |
| 2021/0408197 A1* | 12/2021 | Zhu | H01L 25/0655 |
| 2023/0055725 A1* | 2/2023 | Wang | H04R 9/06 |
| 2023/0084437 A1* | 3/2023 | Bok | G06F 1/1616 |
| | | | 257/40 |
| 2023/0221767 A1* | 7/2023 | Vakhshouri | G06F 3/04144 |
| | | | 345/173 |
| 2023/0316974 A1* | 10/2023 | Kim | G01L 1/2262 |
| | | | 345/619 |
| 2024/0023238 A1* | 1/2024 | Wang | G09F 9/301 |
| 2024/0121892 A1* | 4/2024 | Sano | H05K 1/0283 |
| 2024/0121893 A1* | 4/2024 | Sano | H05K 1/0283 |

\* cited by examiner

STRETCHABLE DEVICE

CROSS-REFERENCE TO RELATED APPLICATION

This application claims the benefit of priority from Japanese Patent Application No. 2022-111992 filed on Jul. 12, 2022, the entire contents of which are incorporated herein by reference.

BACKGROUND

1. Technical Field

What is disclosed herein relates to a stretchable device.

2. Description of the Related Art

Stretchable devices include a resin base member and have excellent elasticity and flexibility. Such a resin base member includes bodies arrayed in a matrix (row-column configuration) and hinges that couple the bodies to each other. As described in Japanese Patent Application Laid-open Publication No. 2021-118273, the hinge has a meandering shape. When a tensile load acts on the stretchable array device, for example, the hinges stretch.

The sensor substrate described in Japanese Patent Application Laid-open Publication No. 2019-174373 (JP-A-2019-174373) has a conductive film extending along the sensor substrate. The conductive film is a strain gauge and detects the amount of strain in the entire sensor substrate. The load acting on the sensor substrate is calculated from the detected amount of strain.

It is desirable for a stretchable device to be able to detect the amount of strain acting on the stretchable device. It is also desirable to be able to detect the amount of strain in each part of the stretchable device (hereinafter referred to as "multi-point detection") instead of the amount of strain in the entire sensor substrate as in JP-A-2019-174373.

For the foregoing reasons, there is a need for a stretchable device that can perform multi-point detection.

SUMMARY

According to an aspect, a stretchable device includes: a resin base member; and an array layer stacked on the resin base member. The resin base member includes: a plurality of bodies disposed in a manner separated from each other; and a plurality of hinges that couple the bodies. Each of the hinges includes a plurality of bends bending when viewed in a stacking direction in which the resin base member and the array layer are stacked. Each of the bends is divided into an inner peripheral portion positioned on an inner side and an outer peripheral portion positioned on an outer side with respect to a center serving as a boundary in a width direction intersecting a direction in which the bend extends. A plurality of the inner peripheral portions included in one of the hinges constitute an inner peripheral region. A plurality of the outer peripheral portions included in one of the hinges constitute an outer peripheral region. The array layer includes a plurality of gauge lines overlapping the respective hinges when viewed in the stacking direction. At least part of each of the gauge lines overlaps one of the inner peripheral region and the outer peripheral region alone when viewed in the stacking direction.

DETAILED DESCRIPTION

Figure 1:
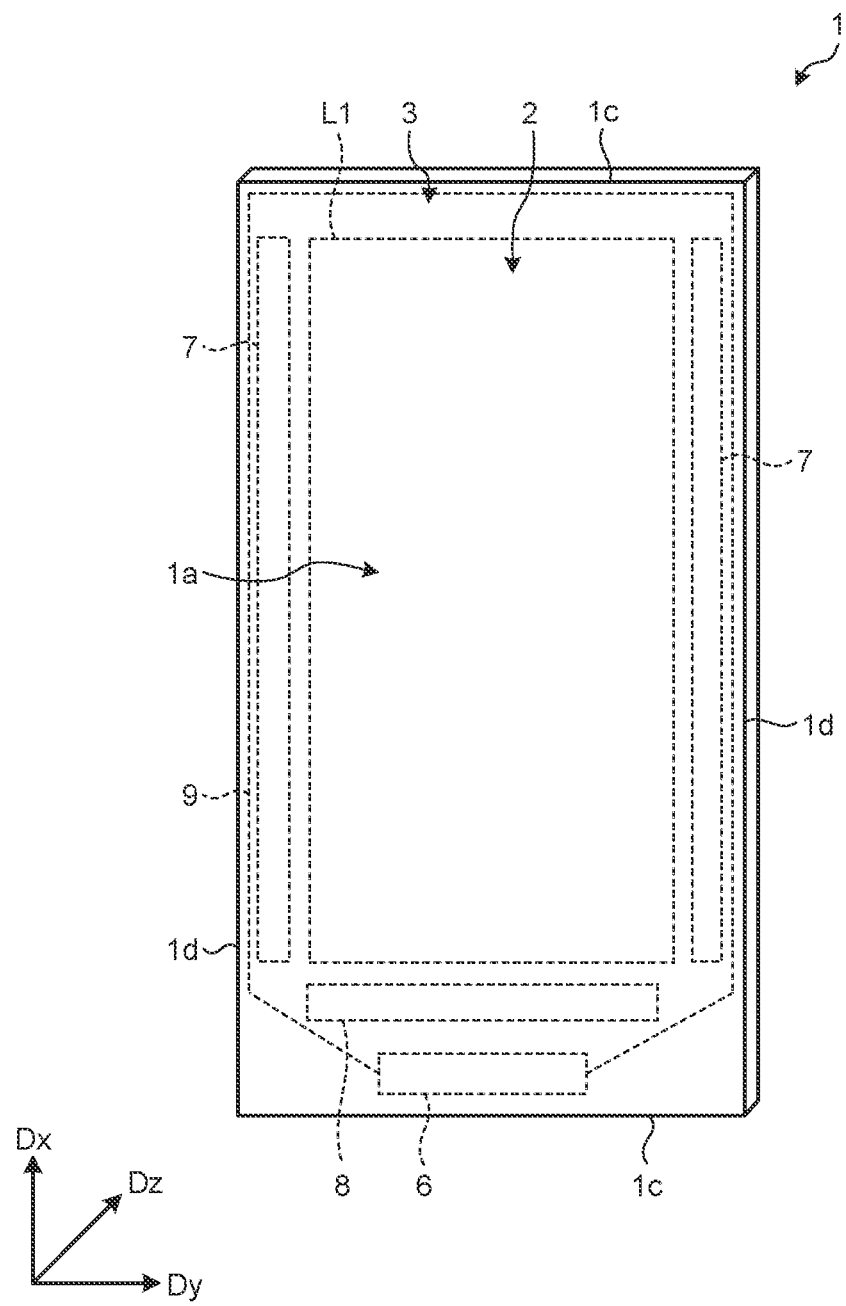
FIG. 1 is a schematic perspective view of a stretchable device according to a first embodiment.

Exemplary aspects (embodiments) to embody the present disclosure are described below in greater detail with reference to the accompanying drawings. The contents described in the embodiments below are not intended to limit the invention according to the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the present invention and easily conceivable by those skilled in the art naturally fall within the scope of the invention. To simplify the explanation, the drawings may possibly illustrate the width, the thickness, the shape, and other elements of each unit more schematically than the actual aspect. These elements, however, are given by way of example only and are not intended to limit interpretation of the present invention. In the present specification and the drawings, components similar to those previously described with reference to previous drawings are denoted by the same reference numerals, and detailed explanation thereof may be appropriately omitted.

When the term "on" is used to describe an aspect where a first structure is disposed on or above a second structure in the present specification and the claims, it includes both of the following cases unless otherwise noted: a case where the first structure is disposed on and in contact with the second structure, and a case where the first structure is disposed above the second structure with still another structure interposed therebetween.

First Embodiment

FIG. 1 is a schematic perspective view of a stretchable device according to a first embodiment. As illustrated in FIG. 1, this stretchable device 1 has a flat plate shape. The stretchable device 1 has a surface 1a and a back surface 1b (not illustrated in FIG. 1, so refer to FIG. 2) facing opposite directions. In the following description, the direction parallel to the surface 1a and the back surface 1b is referred to as a planar direction. A direction parallel to the planar direction is referred to as a first direction Dx. A direction parallel to the planar direction and intersecting the first direction Dx is referred to as a second direction Dy.

The surface 1a and the back surface 1b has a rectangular (quadrilateral) shape. The surface 1a has a pair of short sides 1c and a pair of long sides 1d. The first direction Dx according to the present embodiment is a direction parallel to the long side 1d. The second direction Dy is a direction parallel to the short side 1c. In other words, the first direction Dx and the second direction Dy according to the present embodiment are orthogonal to each other. The normal direction (stacking direction) of the surface 1a is referred to as a third direction Dz. The view of the stretchable device 1 in the third direction Dz is referred to as plan view.

The stretchable device 1 is divided into a detection region 2 and a peripheral region 3 in plan view. The detection region 2 is a region in which the amount of strain of the stretchable device 1 can be detected. The peripheral region 3 is a frame-like region surrounding the outer periphery of the detection region 2. In FIG. 1, a boundary line L1 is drawn to make the boundary between the detection region 2 and the peripheral region 3 easy to understand.

Figure 2:
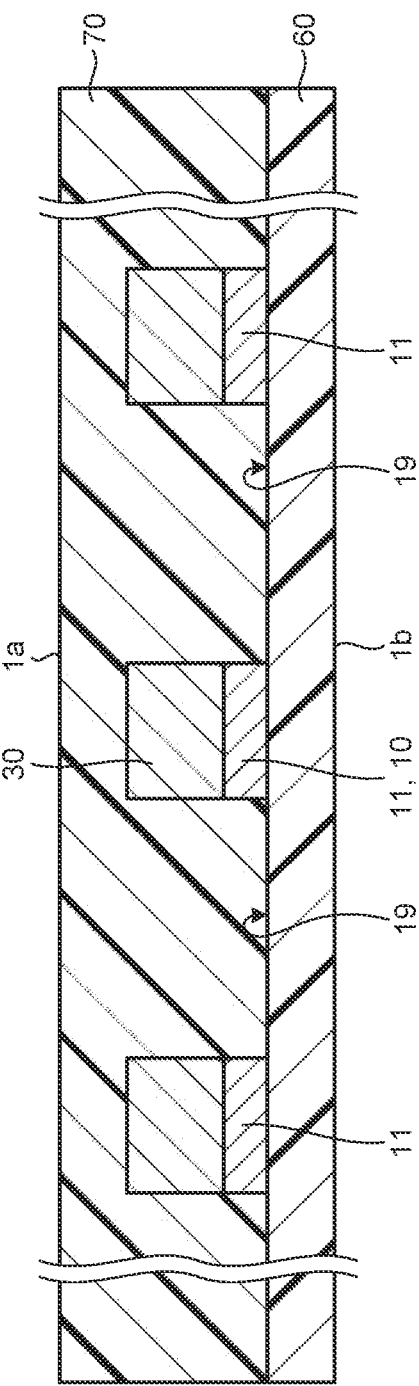
FIG. 2 is a schematic of a section of the stretchable device according to the first embodiment, and more specifically a sectional view along line II-II of FIG. 3.
Figure 3:
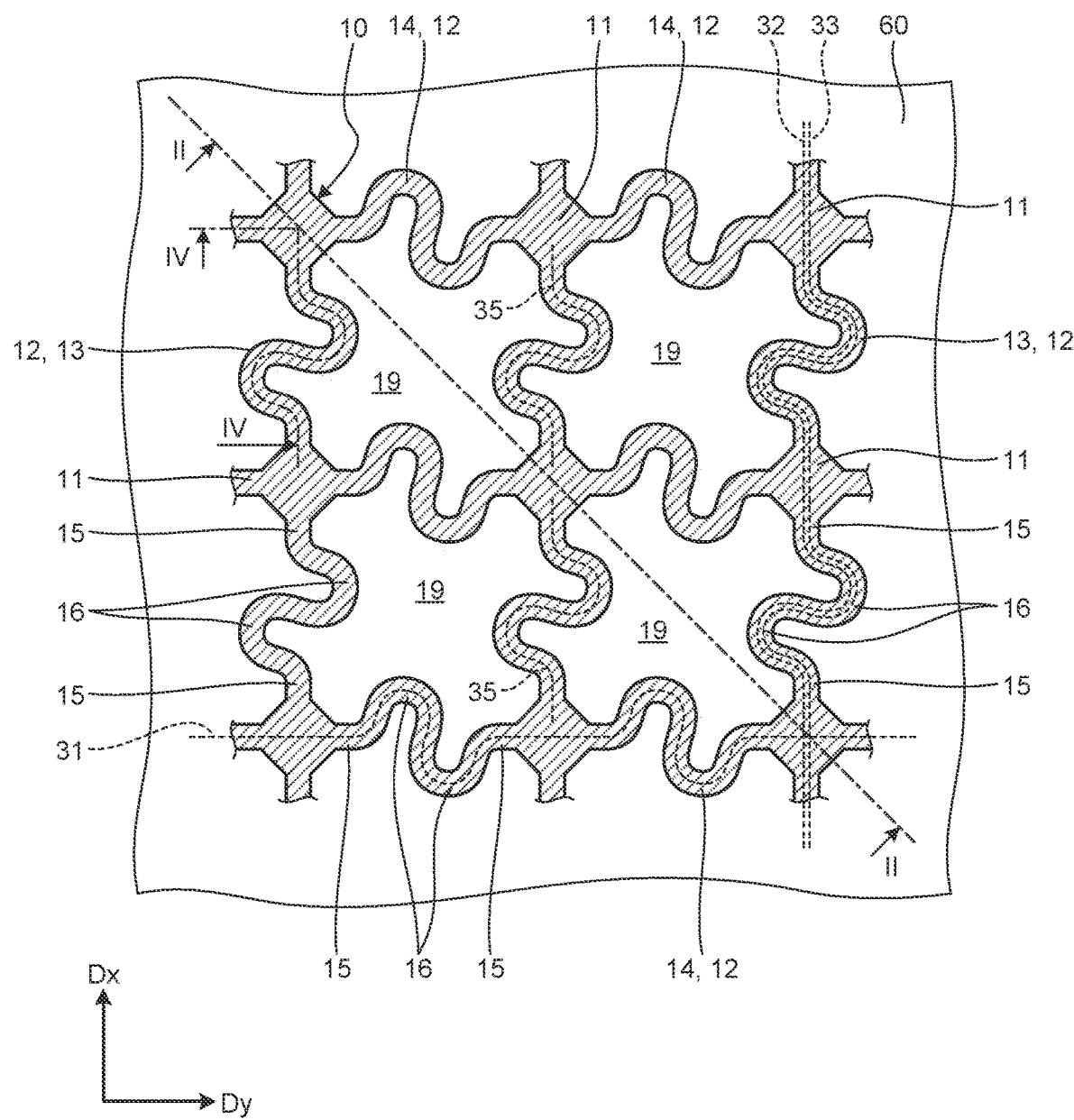
FIG. 3 is an enlarged view of part of a resin base member and a first resin plate of the stretchable device according to the first embodiment viewed from an array layer.

FIG. 2 is a schematic of a section of the stretchable device according to the first embodiment, and more specifically a sectional view along line II-II of FIG. 3. As illustrated in FIG. 2, the stretchable device 1 includes a first resin plate 60, a resin base member 10, an array layer 30, and a second resin plate 70. The first resin plate 60 has the back surface 1b. The resin base member 10 and the array layer 30 are stacked in order on the first resin plate 60. The second resin plate 70 has the surface 1a.

The first resin plate 60 and the second resin plate 70 are made of resin material and have elasticity and flexibility. While examples of the resin material include, but are not limited to, acrylic resin, epoxy resin, urethane resin, etc., the present disclosure is not limited thereto. The first resin plate 60 and the second resin plate 70 sandwich the resin base member 10 and the array layer 30.

In the following description, the upper side or upward refers to one side of the third direction Dz and the side on which the second resin plate 70 is positioned when viewed from the first resin plate 60. The lower side or downward refers to the other side of the third direction Dz and the side on which the first resin plate 60 is positioned when viewed from the second resin plate 70.

FIG. 3 is an enlarged view of part of the resin base member and the first resin plate of the stretchable device according to the first embodiment viewed from the array layer. In FIG. 3, the hatched area is the resin base member 10. The resin base member 10 is provided on the upper surface of the first resin plate 60. The resin base member 10 has elastic, flexible, and insulating properties. The resin base member 10 is made of resin material, such as polyimide.

As illustrated in FIG. 3, the resin base member 10 includes bodies 11 and hinges 12. The bodies 11 are arrayed in a matrix (row-column configuration) in the first direction Dx and the second direction Dy. The hinges 12 couple the bodies 11.

The body 11 according to the present embodiment has a rectangular shape in plan view. The array layer 30 stacked on the body 11 includes a transistor 50 (refer to FIG. 4). The shape of the body 11 in plan view is not limited to a rectangle and may be circular or other polygonal shapes.

The hinges 12 include first hinges 13 and second hinges 14. The first hinge 13 extends in the first direction Dx. The second hinge 14 extends in the second direction Dy. The array layer 30 stacked on the first hinge 13 includes a signal line 32, a current supply line 33, and a gauge line 35. By contrast, the array layer 30 stacked on the second hinge 14 includes a gate line 31. When the first hinge 13 is rotated by 90 degrees when viewed in the third direction Dz, it has the same shape as that of the second hinge 14. Therefore, the shape of the hinge 12 is described using the first hinge 13, and the description of the second hinge 14 is omitted.

The first hinge 13 extends in the first direction Dx while meandering between two bodies 11. The first hinge 13 includes two bases 15 and two arcs 16. The two bases 15 are disposed at both ends of the first hinge 13 in the longitudinal direction. The two arcs 16 are arranged at the center of the first hinge 13 in the longitudinal direction.

The base 15 is continuous with the body 11 and linearly extends from the body 11 in the first direction Dx. The arc 16 has an arc shape. One of the two arcs 16 protrudes toward one side in the second direction Dy with respect to the base 15. The other of the two arcs 16 protrudes toward the other side in the second direction Dy with respect to the base 15.

The resin base member 10 has a plurality of hollow portions 19 each surrounded by four hinges 12 disposed in a frame shape. The hollow portion 19 is a hole passing through the resin base member 10.

As illustrated in FIG. 2, neither the resin base member 10 nor the array layer 30 is stacked in the hollow portion 19. The hollow portion 19 is filled with the second resin plate 70 instead. With this configuration, the stretchable device 1 has low rigidity in the area overlapping the hollow portion 19 and has elasticity and bendability (stretchability). In other words, when a load acts on the stretchable device 1, the hinges 12 deform and the deformation of the bodies 11 is suppressed. This mechanism reduces damage to functional elements (transistors 50 according to the present embodiment) stacked on the bodies 11. While the hollow portion 19 according to the present embodiment is filled with the second resin plate 70, it may be filled with the first resin plate 60 or with the first resin plate 60 and the second resin plate 70.

The following describes the array layer 30. The array layer 30 includes a plurality of gauge lines 35 (refer to FIG. 3) to detect the amount of deformation of the hinges 12. The gauge line 35 according to the present embodiment is disposed overlapping only the first hinge 13. Therefore, the gauge line 35 detects only the strain generated in the first hinge 13 and does not detect the strain generated in the second hinge 14.

The array layer 30 also includes various components for detecting the resistance of the gauge line 35. Specifically, the array layer 30 includes the transistors 50 (refer to FIG. 4), the gate lines 31 (refer to FIG. 3), the signal lines 32 (refer to FIG. 3), the current supply lines 33 (refer to FIG. 3), a coupler 6 (refer to FIG. 1), a gate line drive circuit 7 (refer to FIG. 1), a signal line selection circuit 8 (refer to FIG. 1), and reference current wiring 9 (refer to FIG. 1).

As illustrated in FIG. 3, the gate line 31 extends in the second direction Dy. A plurality of the gate lines 31, which are not specifically illustrated in FIG. 3, are arranged in the first direction Dx. The signal line 32 and the current supply line 33 extend in the first direction Dx. A plurality of the signal lines 32 and a plurality of the current supply lines 33, which are not specifically illustrated in FIG. 3, are arranged in the second direction Dy.

Figure 29:
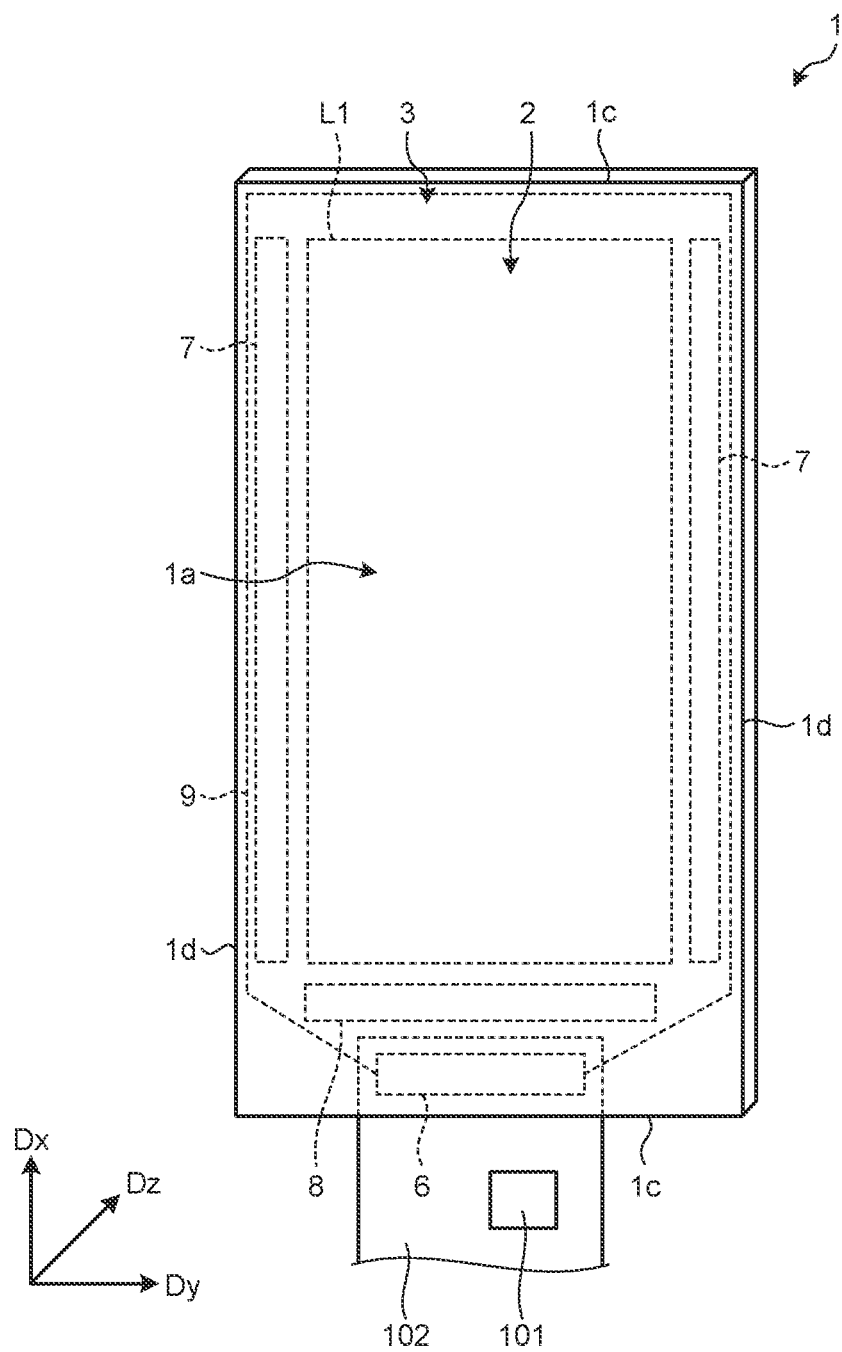
FIG. 29 is a schematic perspective view of the stretchable device according to another embodiment.

As illustrated in FIG. 1, the coupler 6, the gate line drive circuit 7, the signal line selection circuit 8, and the reference current wiring 9 are disposed overlapping the peripheral region 3. The coupler 6 is coupled to a drive integrated circuit (IC) disposed outside the stretchable device 1. The drive IC may be mounted as a chip on film (COF) on a flexible printed circuit board (refer to FIG. 29, where reference numeral 101 denotes the drive IC, and reference numeral 102 denotes the flexible printed circuit board) coupled to the coupler 6 or on a rigid board. Alternatively, the drive IC may be mounted as a chip on glass (COG) in the peripheral region 3 of the first resin plate 60.

The gate line drive circuit 7 is a circuit that drives the gate lines 31 based on various control signals supplied from the drive IC. The gate line drive circuit 7 sequentially or simultaneously selects the gate lines 31 and supplies gate drive signals to the selected gate line 31. The signal line selection circuit 8 is a switch circuit that sequentially or simultaneously selects the signal lines 32. The signal line selection circuit 8 is a multiplexer, for example. The signal line selection circuit 8 couples the selected signal line 32 to the drive IC based on a selection signal supplied from the drive IC. The reference current wiring 9 is wiring for supplying a predetermined amount of electric current to the current supply lines 33 and extends along the peripheral region 3. The reference current wiring 9 is coupled to the drive IC via the coupler 6, and a predetermined amount of electric current flows through it.

Figure 4:
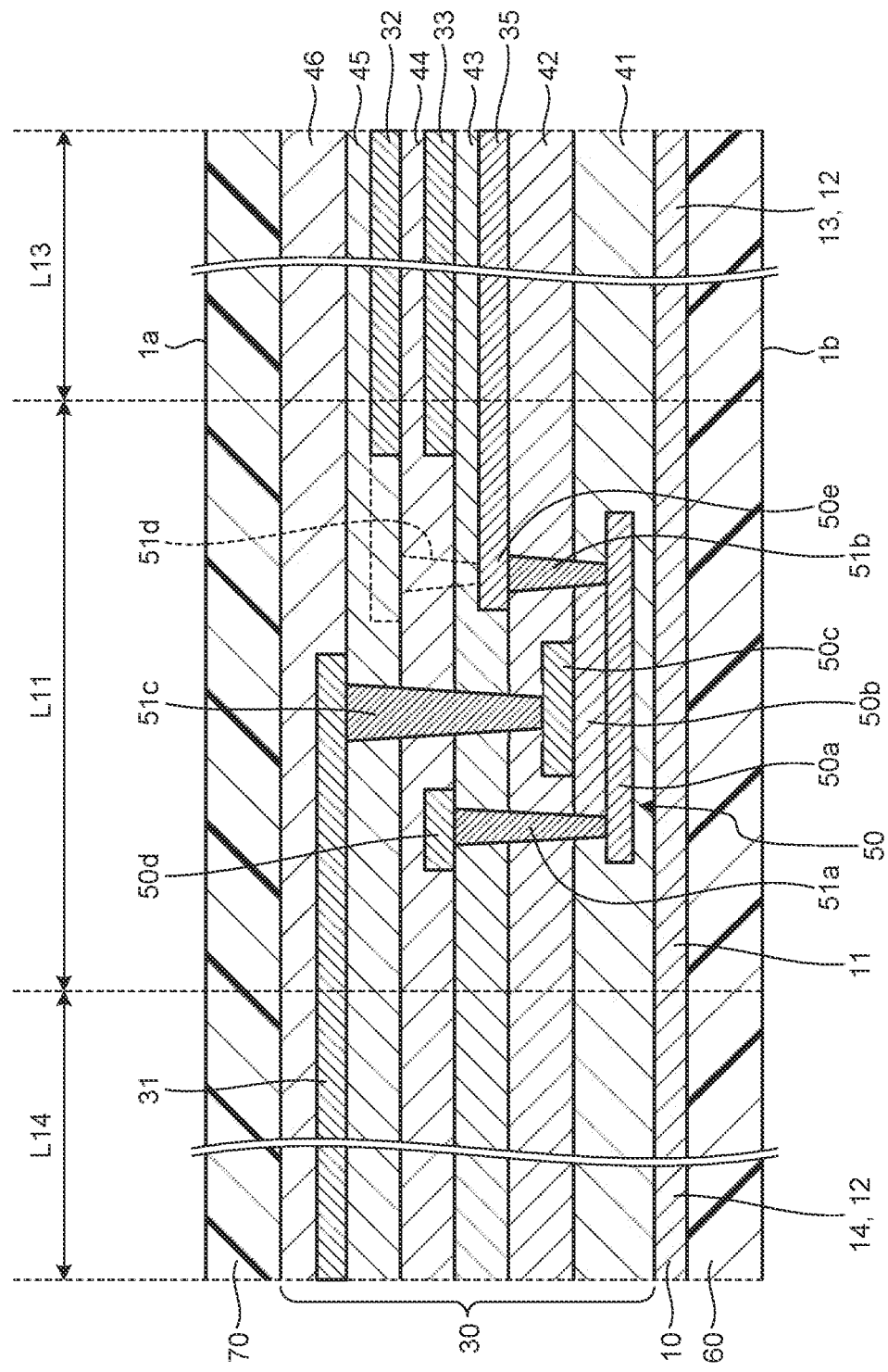
FIG. 4 is a sectional view seen in the arrow direction along line IV-IV of FIG. 3.

FIG. 4 is a sectional view seen in the arrow direction along line IV-IV of FIG. 3. The following describes the sectional structure of the array layer 30. In FIG. 4, the area indicated by arrow L11 is the area overlapping the body 11 in plan view. The area indicated by arrow L13 is the area overlapping the first hinge 13 in plan view. The area indicated by arrow L14 is the area overlapping the second hinge 14 in plan view.

As illustrated in FIG. 4, the array layer 30 includes a plurality of insulating layers. Specifically, the array layer 30 includes a first insulating layer 41, a second insulating layer 42, a third insulating layer 43, a fourth insulating layer 44, a fifth insulating layer 45, and a sixth insulating layer 46 stacked in order on the upper side of the resin base member 10. The first insulating layer 41, the second insulating layer 42, the third insulating layer 43, the fourth insulating layer 44, the fifth insulating layer 45, and the sixth insulating layer 46 are silicon oxide films, for example, and cover the transistor 50 and various kinds of wiring (the gate line 31, the signal line 32, the current supply line 33, and the gauge line 35).

The gate line 31 is formed on the fifth insulating layer 45. The gate line 31 is stacked over the fifth insulating layer 45 on the body 11 and the fifth insulating layer 45 on the second hinge 14 and continuously extends in the planar direction (second direction Dy). As illustrated in FIG. 3, the gate line 31 extends over a plurality of the bodies 11 and a plurality of the second hinges 14. As a result, the gate line 31 continuously extends from one end to the other of the detection region 2 in the second direction Dy.

As illustrated in FIG. 4, the signal line 32 is formed on the fourth insulating layer 44. The signal line 32 is stacked over the fourth insulating layer 44 on the body 11 and the fourth insulating layer 44 on the first hinge 13 and continuously extends in the planar direction (first direction Dx). As illustrated in FIG. 3, the signal line 32 extends over a plurality of the bodies 11 and a plurality of the first hinges 13. As a result, the signal line 32 continuously extends from one end to the other of the detection region 2 in the first direction Dx.

The current supply line 33 is wiring coupled to the reference current wiring 9 to supply a predetermined amount of electric current to the gauge lines 35. As illustrated in FIG. 4, the current supply line 33 is formed on the third insulating layer 43. The current supply line 33 is stacked over the third insulating layer 43 on the body 11 and the third insulating layer 43 on the first hinge 13 and continuously extends in the planar direction (first direction Dx). As illustrated in FIG. 3, the current supply line 33 extends over a plurality of the bodies 11 and a plurality of the first hinges 13. As a result, the current supply line 33 continuously extends from one end to the other of the detection region 2 in the first direction Dx.

As illustrated in FIG. 4, the gauge line 35 is formed on the second insulating layer 42. The gauge line 35 is stacked over the second insulating layer 42 on the body 11 and the second insulating layer 42 on the first hinge 13 and continuously extends in the planar direction (first direction Dx). As illustrated in FIG. 3, the gauge line 35 extends over one body 11 and one first hinge 13. Thus, the gauge lines 35 extend in the first direction Dx in a manner separated from each other.

Figure 8:
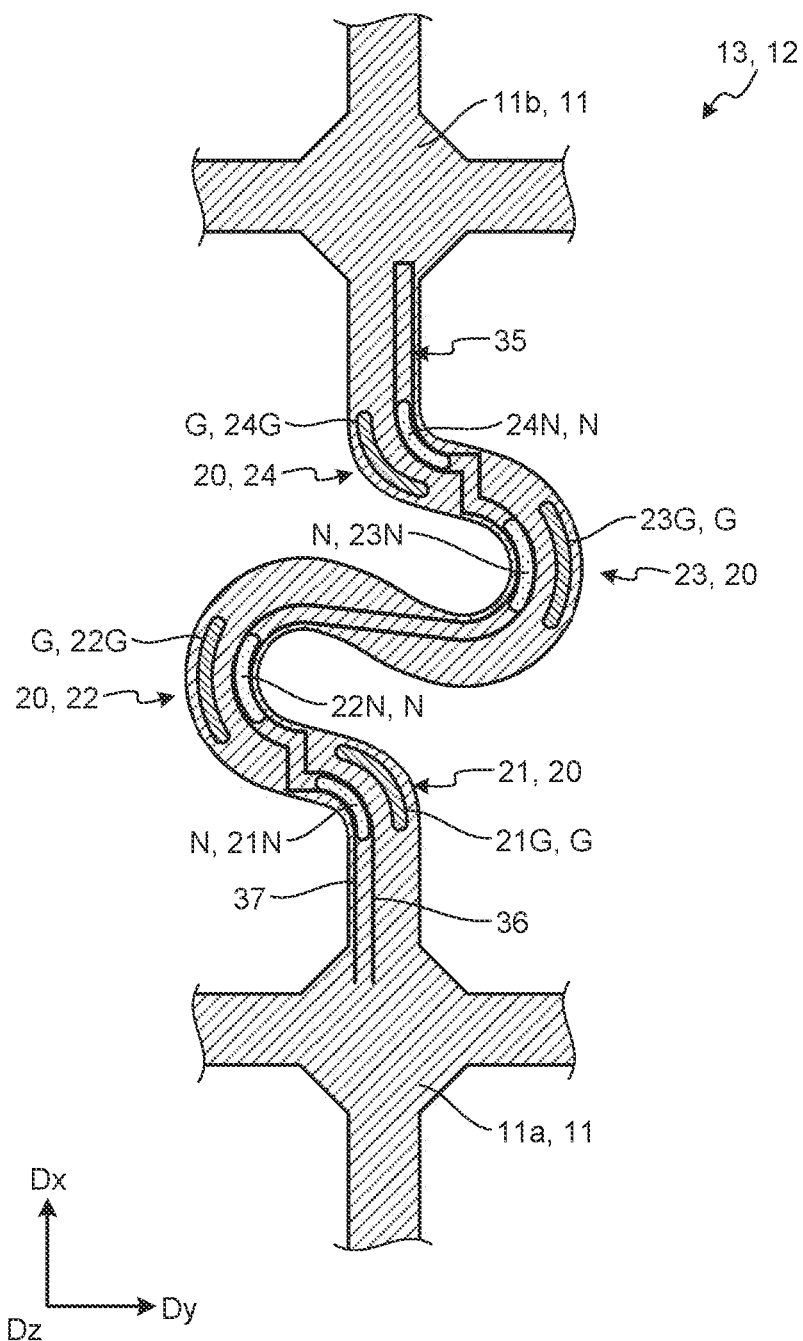
FIG. 8 is a view of the positional relation between the first hinge and a gauge line according to the first embodiment.

The gauge line 35 according to the present embodiment extends from a first end to a second end of the first hinge 13, turns around at the second end of the first hinge 13, and returns to the first end of the first hinge 13 (refer to FIG. 8). In other words, the gauge line 35 has a U-shape in plan view, and the two ends (the start point and the end point) of the gauge line 35 overlap the body 11.

As illustrated in FIG. 4, the transistor 50 includes a semiconductor layer 50a, a gate insulating film 50b, a gate electrode 50c, a drain electrode 50d, and a source electrode 50e. The semiconductor layer 50a is coupled to the drain electrode 50d and the source electrode 50e via contact layers 51a and 51b, respectively. The gate electrode 50c is coupled to the gate line 31 via a contact layer 51c. The drain electrode 50d is disposed in the same layer as that of the current supply line 33 and is coupled to the current supply line 33. The source electrode 50e is disposed in the same layer as that of the gauge line 35 and is coupled to one end (start point) of the gauge line 35. The other end (end point) of the gauge line 35 is coupled to the signal line 32 via a contact layer 51d.

Figure 5:
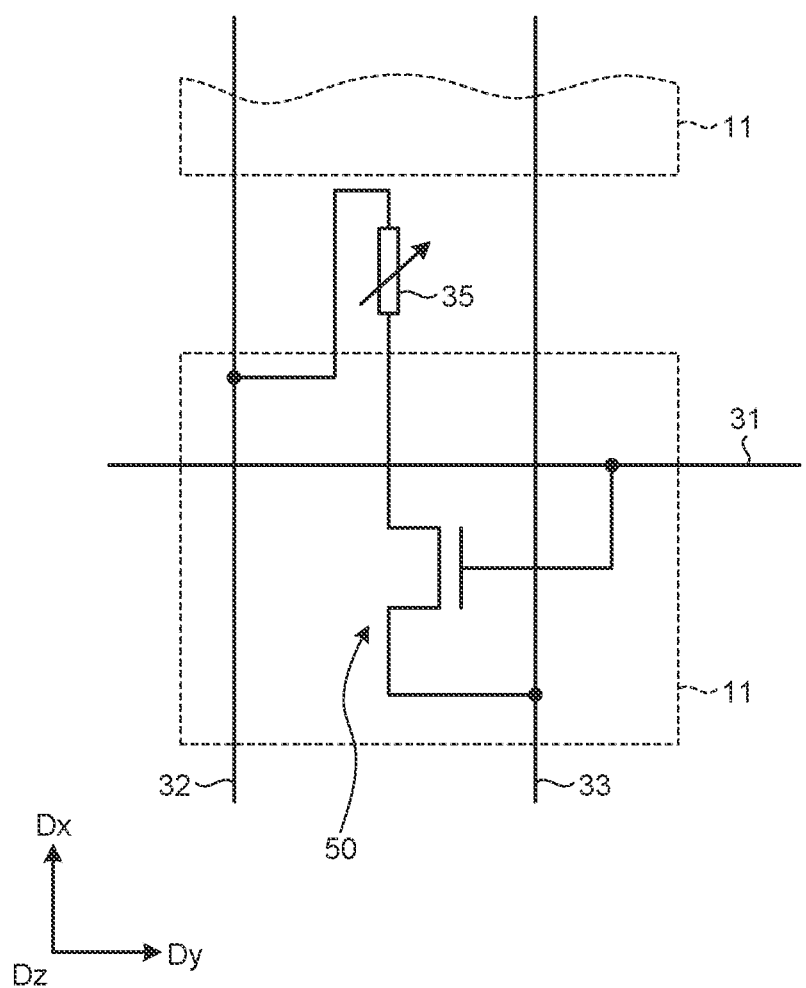
FIG. 5 is a circuit diagram of the circuit configuration in the stretchable device according to the first embodiment.

FIG. 5 is a circuit diagram of the circuit configuration in the stretchable device according to the first embodiment. The following describes the circuit configuration included in the array layer 30. As illustrated in FIG. 5, when the gate line 31 is selected and scanned by the gate line drive circuit 7, the transistor 50 is turned ON. As a result, the current supply line 33 and one end (start point) of the gauge line 35 are electrically coupled, and a predetermined amount of electric current flows to the gauge line 35. Subsequently, an electric current (electrical signal) is input to the signal line 32 coupled to the other end (end point) of the gauge line 35. The electric current (electrical signal) input to the signal line 32 is transmitted to the drive IC.

If the first hinge 13 is deformed (a strain is generated in the gauge line 35), the resistance of the gauge line 35 changes. In other words, the current value input to the signal line 32 differs between when a strain is generated and when no strain is generated in the gauge line 35. Therefore, the drive IC detects the amount of strain in the gauge line 35 from the amount of change in the current value.

The following describes the first hinge 13 and the gauge line 35 according to the present embodiment in greater detail.

Figure 6:
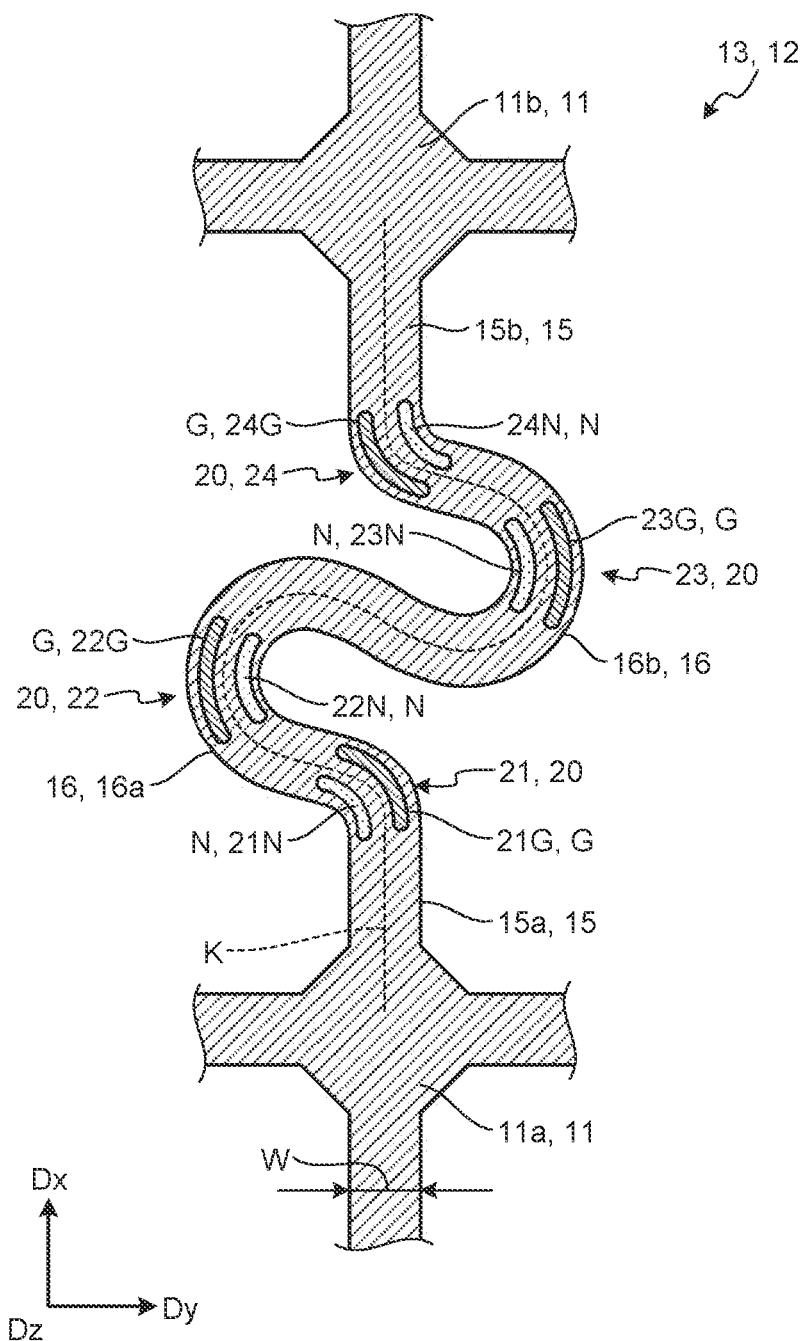
FIG. 6 is an enlarged view of a first hinge according to the first embodiment.
Figure 7:
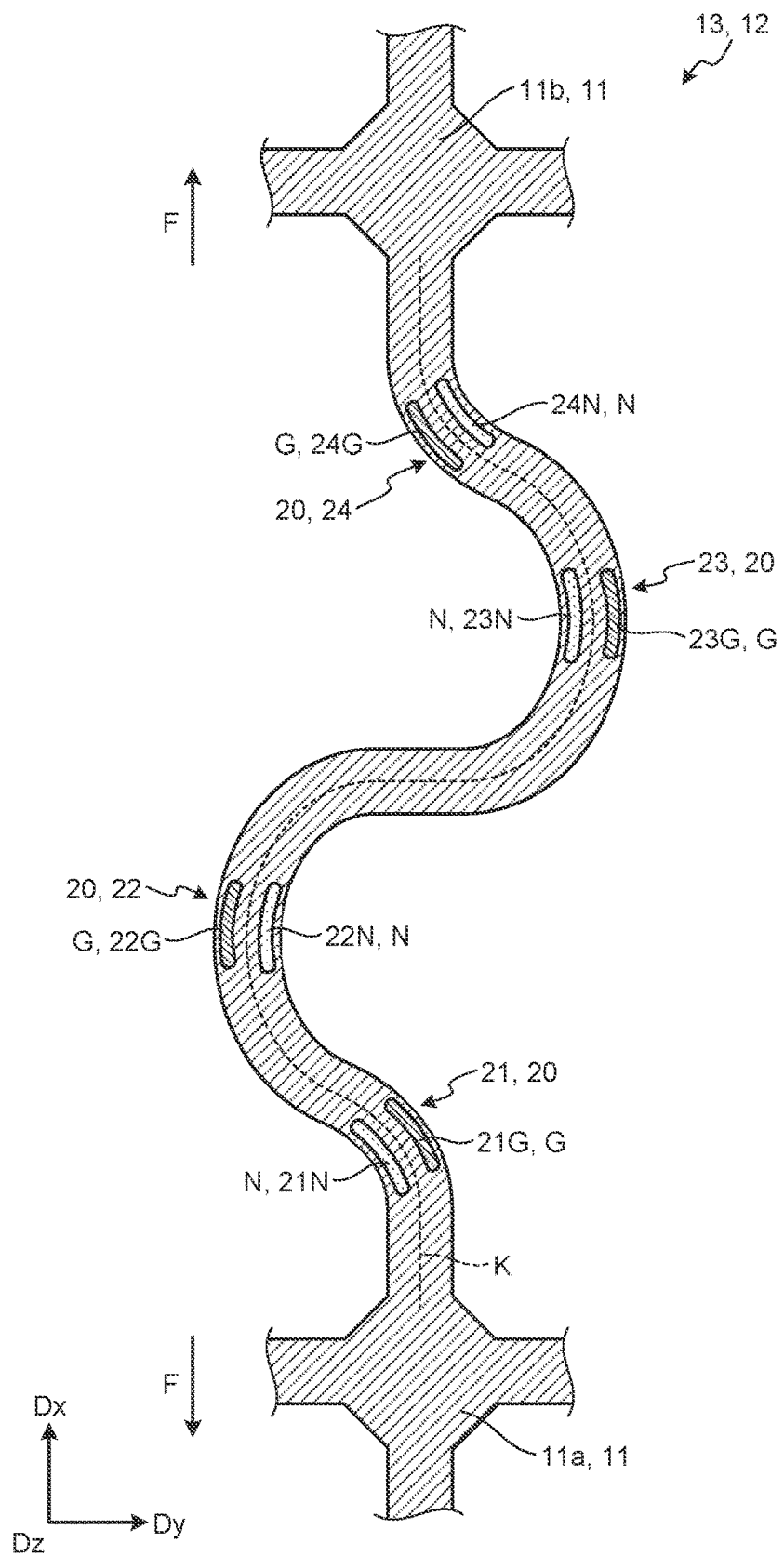
FIG. 7 is an enlarged view of the first hinge according to the first embodiment when a load that stretches the first hinge in a first direction is applied.

FIG. 6 is an enlarged view of the first hinge according to the first embodiment. FIG. 7 is an enlarged view of the first hinge according to the first embodiment when a load that stretches the first hinge in the first direction is applied. FIG. 8 is a view of the positional relation between the first hinge and the gauge line according to the first embodiment.

For the convenience of explanation, one of the two bodies 11 provided on both sides of the first hinge 13 is referred to as a first body 11a, and the other is referred to as a second body 11b as illustrated in FIG. 6. One of the two bases 15 coupled to the first body 11a is referred to as a first base 15a, and the other coupled to a second body 11b is referred to as a second base 15b. One of the two arcs 16 coupled to the first base 15a is referred to as a first arc 16a, and the other coupled to the second base 15b is referred to as a second arc 16b. A virtual line K illustrated in FIG. 6 passes through the center of the first hinge 13 in a width direction W.

As illustrated in FIG. 6, in the first hinge 13, the coupling portion between the first base 15a and the first arc 16a is bent by 90 degrees to form a first bend 21. The first arc 16a itself is bent by 180 degrees to form a second bend 22. The second arc 16b itself is also bent by 180 degrees to form a third bend 23. The coupling portion between the second arc 16b and the second base 15b is bent by 90 degrees to form a fourth bend 24.

In the following description, the first bend 21, the second bend 22, the third bend 23, and the fourth bend 24 are collectively referred to as bends 20. The bends 20 are each divided into two portions: an inner peripheral portion positioned on the inner side and an outer peripheral portion positioned on the outer side with respect to the virtual line K serving as the boundary. In FIG. 6, the inner peripheral portion and the outer peripheral portion of each bend 20 are enclosed by ellipses to define the areas of the inner peripheral portion and the outer peripheral portion. However, the entire area on the inner peripheral side with respect to the virtual line K is the inner peripheral portion, and the entire area on the outer peripheral side with respect to the virtual line K is the outer peripheral portion. Therefore, the area enclosed by the ellipse is part of the inner peripheral portion or the outer peripheral portion.

When an extension load (refer to arrow F in FIG. 7) acts on the stretchable device 1 in the first direction Dx, for example, the first hinge 13 stretches in the first direction Dx as illustrated in FIG. 7. In other words, the bending angle of each bend 20 increases, and the length of the first hinge 13 in the first direction Dx increases. When the bending angle of each bend 20 increases, the following loads (stresses) act on the inner peripheral portion and the outer peripheral portion of each bend 20.

A tensile load acts on a first inner peripheral portion 21N of the first bend 21. A compressive load acts on a first outer peripheral portion 21G of the first bend 21. A tensile load acts on a second inner peripheral portion 22N of the second bend 22. A compressive load acts on a second outer peripheral portion 22G of the second bend 22. A tensile load acts on a third inner peripheral portion 23N of the third bend 23. A compressive load acts on a third outer peripheral portion 23G of the third bend 23. A tensile load acts on a fourth inner peripheral portion 24N of the fourth bend 24. A compressive load acts on a fourth outer peripheral portion 24G of the fourth bend 24.

In other words, a tensile load acts on the inner peripheral portion of each bend 20, and a compressive load acts on the outer peripheral portion of each bend 20. Therefore, if the gauge line 35 extends along the ends of the first hinge 13, both tensile and compressive loads act on it. In the following description, a region composed of the inner peripheral portions is referred to as an inner peripheral region N, a region composed of the outer peripheral portions is referred to as an outer peripheral region G.

The above describes a case where an extension load acts on the stretchable device 1 in the first direction Dx, for example. When a compressive load acts on the stretchable device 1 in the first direction Dx, a compressive load acts on the inner peripheral portion of each bend 20, and a tensile load acts on the outer peripheral portion of each bend 20.

As illustrated in FIG. 8, the gauge line 35 according to the present embodiment has an outward gauge portion 36 and a return gauge portion 37. The outward gauge portion 36 extends from the first body 11a to the second body 11b. The return gauge portion 37 turns around at the second body 11b and extends to the first body 11a. In other words, the gauge line 35 has a U-shape that turns around at the second body 11b and returns to the first body 11a.

The outward gauge portion 36 and the return gauge portion 37 are disposed overlapping the first inner peripheral portion 21N in the first bend 21. The outward gauge portion 36 and the return gauge portion 37 are disposed overlapping the second inner peripheral portion 22N in the second bend 22. The outward gauge portion 36 and the return gauge portion 37 are disposed overlapping the third inner peripheral portion 23N in the third bend 23. The outward gauge portion 36 and the return gauge portion 37 are disposed overlapping the fourth inner peripheral portion 24N in the fourth bend 24.

In other words, the outward gauge portion 36 and the return gauge portion 37 are disposed overlapping only the inner peripheral region N and not overlapping the outer peripheral region G in each bend 20. This configuration prevents both tensile and compressive loads from being applied to the gauge line 35 in the first hinge 13. Therefore, the load (amount of strain) acting on the first hinge 13 can be accurately detected.

In the present disclosure, the arrangement of the gauge line 35 is not particularly limited in the area not overlapping the bend 20, such as in the base 15. In other words, the gauge line 35 may be disposed at the center so as to overlap the virtual line K or closer to the end so as to be away from the virtual line K in the width direction W.

As described above, the inner peripheral portion and the outer peripheral portion of each bend 20 are significantly deformed in the hinge 12. In other words, if the gate line 31, the signal line 32, and the current supply line 33 are deformed to change the resistance, the amount of strain may possibly fail to be accurately detected. To address this, the gate line 31, the signal line 32, and the current supply line 33 according to the present embodiment are disposed overlapping the center (virtual line K) of the hinge 12, which is not particularly illustrated.

As described above, the gauge line 35 according to the first embodiment has a common strain in the areas overlapping the respective bends 20. Therefore, the load acting on the first hinge 13 can be detected. The gauge lines 35 are disposed overlapping more than one first hinge 13, thereby enabling multi-point detection.

The gauge line 35 according to the first embodiment overlaps the inner peripheral portions (the first inner peripheral portion 21N, the second inner peripheral portion 22N, the third inner peripheral portion 23N, and the fourth inner peripheral portion 24N) of the respective bends 20. Therefore, the gauge line 35 according to the first embodiment has a larger amount of generated strain and higher detection sensitivity than in a case where it overlaps only one of the inner peripheral portions of the bends 20, for example.

The gauge line 35 according to the first embodiment includes two wiring lines (gauge lines) of the outward gauge portion 36 and the return gauge portion 37. Therefore, the gauge line 35 according to the first embodiment has a larger amount of generated strain and higher detection sensitivity than in a case where it is composed of one gauge line.

While the first embodiment has been described above, the present disclosure is not limited to the example described in the first embodiment. While the gauge lines according to the first embodiment are provided to the first hinges, for example, the gauge lines according to the present disclosure may be provided to the second hinges. Alternatively, the gauge lines may be provided to both the first hinges and the second hinges.

The hinge according to the present disclosure simply needs to have one or more bends 20 where a tensile load and/or a compressive load is generated due to deformation, and the shape of the hinge is not limited to the example described in the first embodiment. The following describes modifications of the hinge.

First Modification

Figure 9:
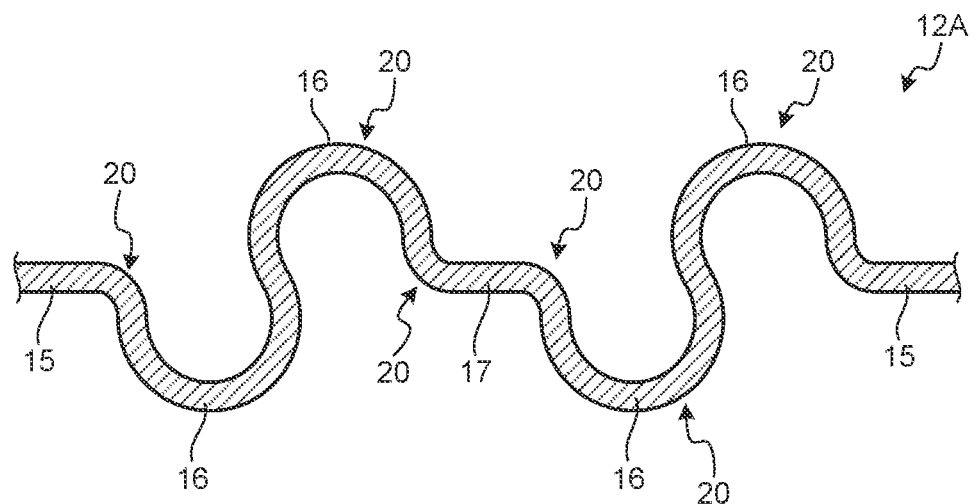
FIG. 9 is a plan view of a hinge according to a first modification.

FIG. 9 is a plan view of the hinge according to a first modification. As illustrated in FIG. 9, a hinge 12A according to the first modification is different from the hinge 12 according to the first embodiment in that it includes four arcs 16. The hinge 12A according to the first modification is different from the hinge 12 according to the first embodiment in that it includes a linear portion 17 linearly extending parallel to the bases 15 between the arcs 16. The first modification increases the number of bends 20, thereby increasing the amount of strain generated in the gauge line 35 and enhancing the detection sensitivity. As described above, the numbers of arcs 16 and bends 20 according to the present disclosure are not particularly limited.

Second Modification

Figure 10:
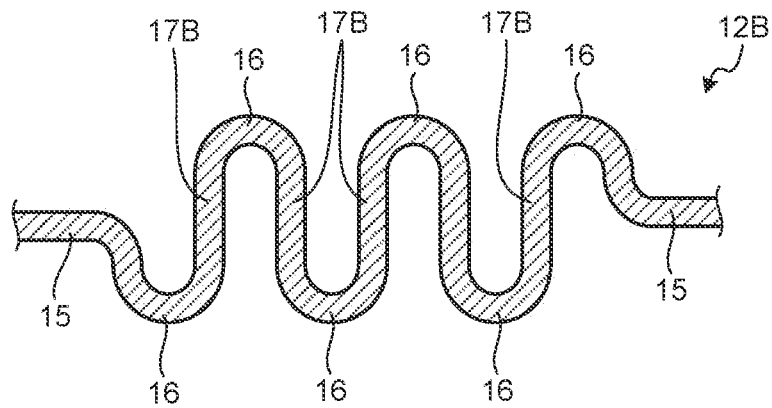
FIG. 10 is a plan view of the hinge according to a second modification.

FIG. 10 is a plan view of the hinge according to a second modification. As illustrated in FIG. 10, a hinge 12B according to the second modification is different from the hinge 12 according to the first embodiment in that it includes linear portions 17B linearly extending in a direction intersecting an extension line of the bases 15 between the arcs 16. As described above, the shape of the coupling portion between the arcs 16 according to the present disclosure is not particularly limited.

Third Modification

Figure 11:
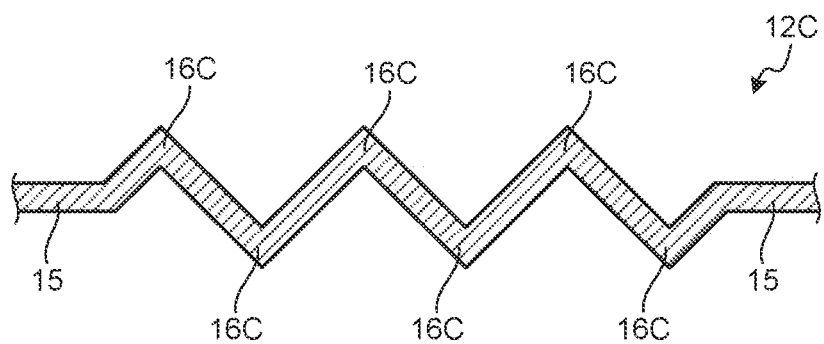
FIG. 11 is a plan view of the hinge according to a third modification.

FIG. 11 is a plan view of the hinge according to a third modification. As illustrated in FIG. 11, a hinge 12C according to the third modification is different from the hinge 12 according to the first embodiment in that it includes a plurality of waveform portions 16C instead of the arcs 16. The waveform portion 16C linearly extends and is bent to form a corner. As described above, the shape of the portions constituting the meandering shape according to the present disclosure is not limited to an arc shape and may be a triangular wave as described in the third modification or a square wave, and is not particularly limited.

The above has described the modifications of the hinge. While the gauge line according to the first embodiment includes the outward gauge portion 36 and the return gauge portion 37, the gauge line according to the present disclosure is not limited thereto. The following describes modifications of the gauge line.

Fourth Modification

Figure 12:
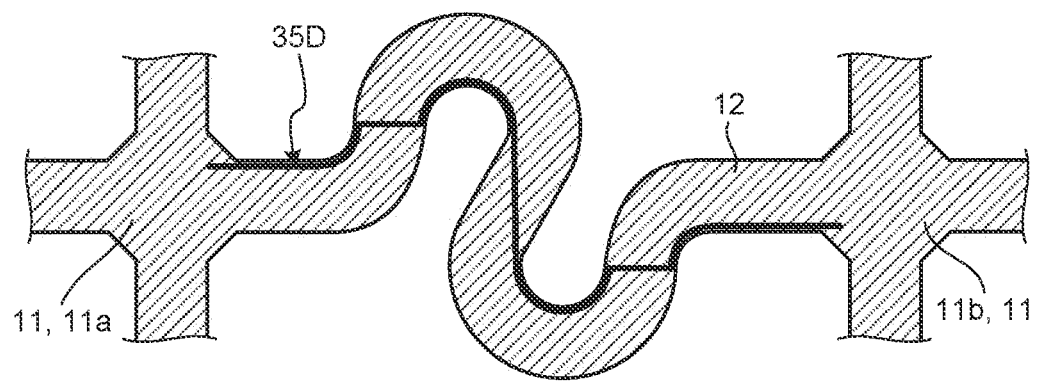
FIG. 12 is a plan view of the hinge and the gauge line according to a fourth modification.

FIG. 12 is a plan view of the hinge and the gauge line according to a fourth modification. As illustrated in FIG. 12, a gauge line 35D according to the fourth modification is different from the first embodiment in that it is composed of one wiring line extending along the hinge 12. The gauge line 35D having such a structure can also detect deformation of the hinge 12. In other words, the number of gauge lines 35 extending along the hinge 12 may be one or two, or three or more, and the number of gauge lines according to the present disclosure is not particularly limited. One end (start point) of the gauge line 35D according to the fourth modification is coupled to the transistor 50 in the first body 11a. The other end (end point) of the gauge line 35D is coupled to the signal line 32 in the second body 11b.

Fifth Modification

Figure 13:
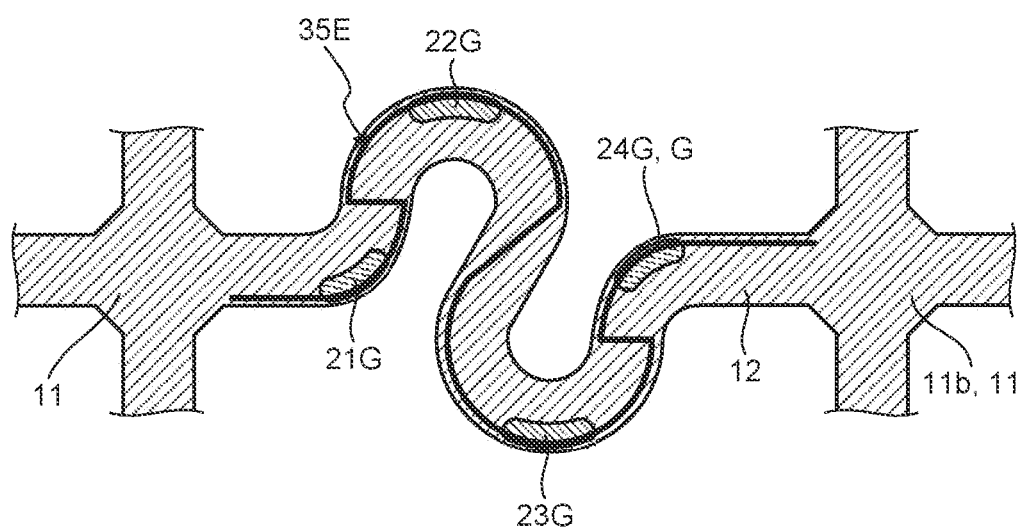
FIG. 13 is a plan view of the hinge and the gauge line according to a fifth modification.

FIG. 13 is a plan view of the hinge and the gauge line according to a fifth modification. A gauge line 35E according to the fifth modification is the same as the fourth modification in that it is composed of one wiring line extending along the hinge 12. The gauge line 35E according to the fifth modification is, however, different from the fourth modification in that it overlaps the outer peripheral region G (the first outer peripheral portion 21G, the second outer peripheral portion 22G, the third outer peripheral portion 23G, and the fourth outer peripheral portion 24G) in plan view. The gauge line 35E having such a structure also has a common strain in the areas overlapping the respective bends 20 and can detect the load acting on the hinge 12. As described above, the gauge line according to the present disclosure simply needs to overlap only one of the inner peripheral region N and the outer peripheral region G when viewed in the third direction Dz (stacking direction).

Sixth Modification

Figure 14:
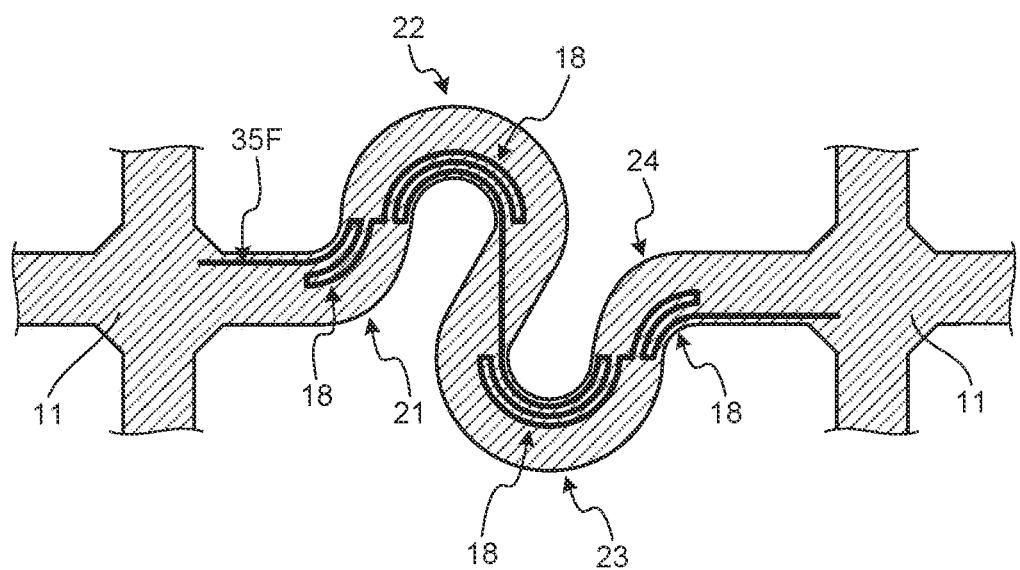
FIG. 14 is a plan view of the hinge and the gauge line according to a sixth modification.

FIG. 14 is a plan view of the hinge and the gauge line according to a sixth modification. A gauge line 35F according to the sixth modification is the same as the fourth modification in that it is composed of one wiring line extending along the hinge 12. The gauge line 35F according to the sixth modification is, however, different from the fourth modification in that it includes folded portions 18. The folded portions 18 are disposed at the respective bends 20 (the first bend 21, the second bend 22, the third bend 23, and the fourth bend 24). The folded portion 18 is folded back from a first side to a second side in the direction in which the bend 20 extends and is folded back again from the second side to the first side in the direction in which the bend extends. Therefore, the gauge line 35F has a longer length at the bends 20. As a result, the gauge line 35F has a larger amount of strain and higher detection sensitivity.

While the above has described the modifications of the gauge line 35, the position of the gauge line 35 in the width direction W is preferably farther away from the virtual line K (refer to FIG. 6) in the inner peripheral portion or the outer peripheral portion. This is because the gauge line 35 has a larger amount of strain and higher detection sensitivity as it is closer to the end of the hinge 12.

While the gauge line according to the embodiment and the modifications are disposed overlapping all the inner (or outer) peripheral portions at the respective bends 20, the present disclosure is not limited thereto. The gauge line may be disposed overlapping the inner (or outer) peripheral portion of one of the bends 20.

While the above has described the modifications of the gauge line, the gauge line 35 preferably has a larger amount of change in resistance due to deformation for higher detection sensitivity. The amount of change in resistance of the gauge line 35 is calculated by the following Expression (1):

$$\Delta R = R K_s \varepsilon = K_s \varepsilon \rho L / S \tag{1}$$

$\Delta R$ in Expression (1) is the amount of change in resistance of the gauge line. R in Expression (1) is the initial resistance of the gauge line. $K_s$ in Expression (1) is the gauge factor. $\varepsilon$ in Expression (1) is the amount of strain in the gauge line. $\rho$ in Expression (1) is the resistivity of the gauge line. L in Expression (1) is the length of the gauge line. s in Expression (1) is the cross-sectional area of the gauge line.

As indicated by Expression (1), the gauge line has a larger amount of change in resistance and higher detection sensitivity as the cross-sectional area s of the gauge line is smaller. Therefore, the width of the gauge line may be set to a relatively small width of 5 μm to 10 μm, for example. By contrast, if the amount of change in resistance due to deformation of the hinge is larger, the gate line 31, the signal line 32, and the current supply line 33 may possibly fail to accurately detect the load acting on the hinge. To address this, the width of the gate line 31, the signal line 32, and the current supply line 33 is preferably set to a relatively large width of 10 μm to 30 μm, for example, to reduce the amount of change in resistance.

The direction of the strain detected by the gauge line 35 according to the first embodiment is not detected. In other words, it is not determined whether the load acting on the stretchable device 1 is an expansion and contraction load or a bending load. The following describes the stretchable device according to a second embodiment that can detect not only the amount of strain but also the direction of strain.

Second Embodiment

Figure 15:
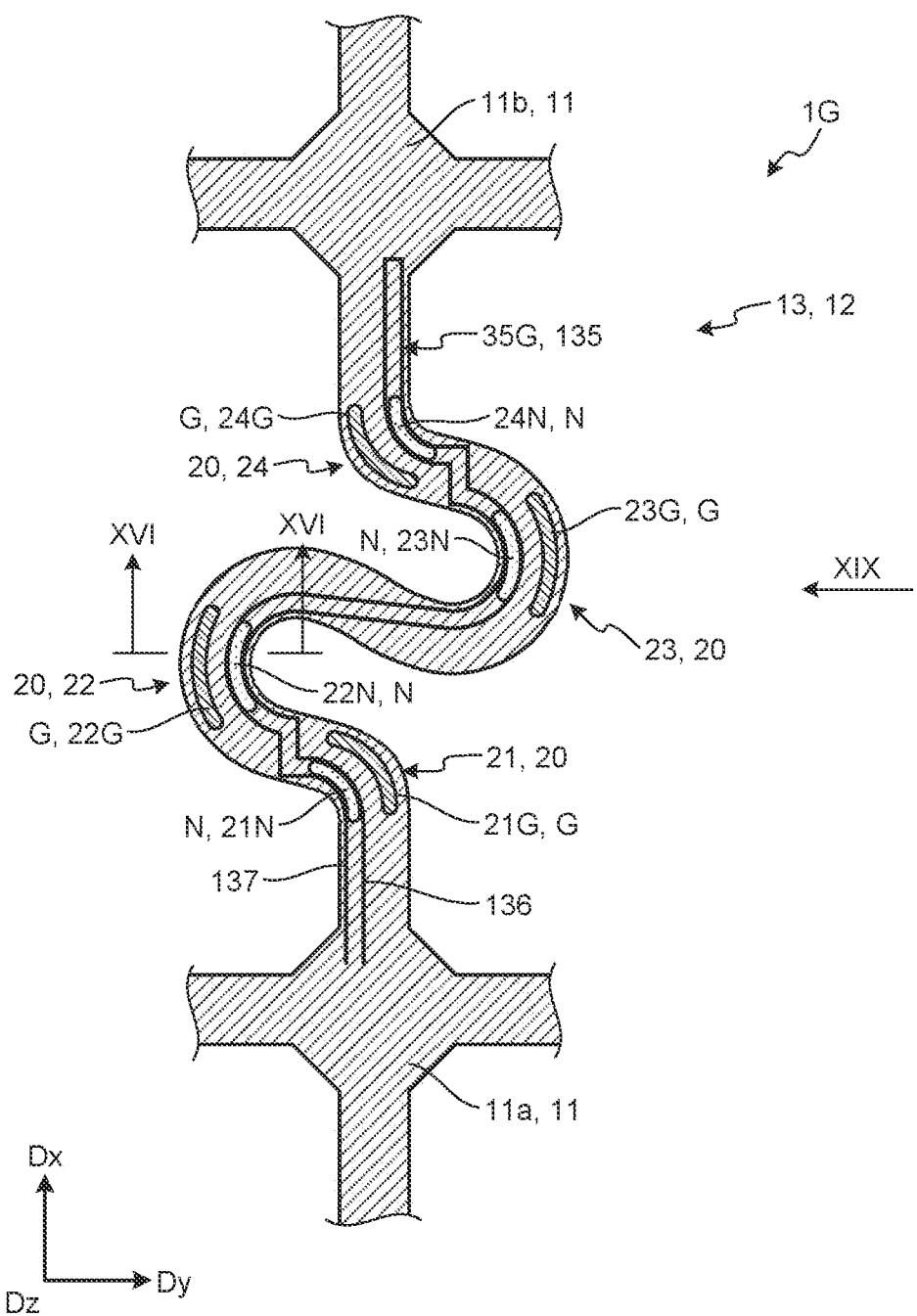
FIG. 15 is a view of the arrangement relation between the first hinge and the gauge line according to a second embodiment in plan view.
Figure 16:
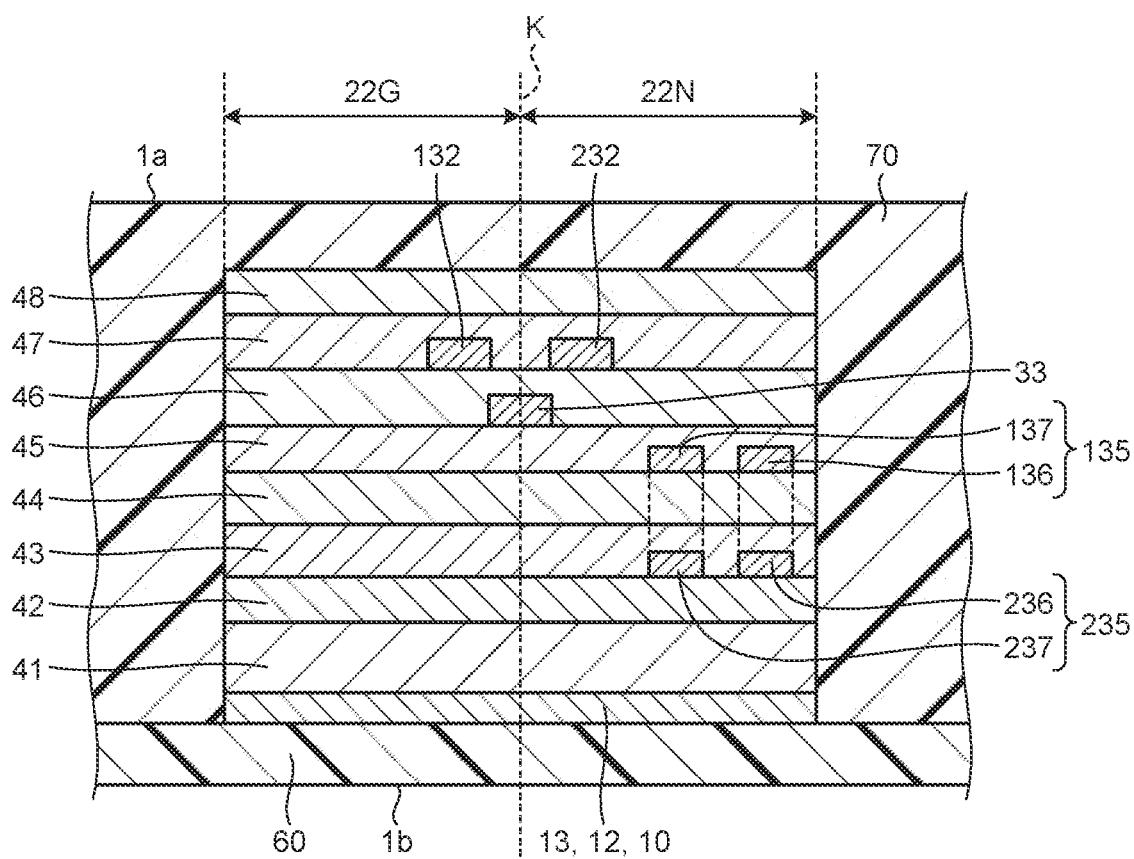
FIG. 16 is a sectional view seen in the arrow direction along line XVI-XVI of FIG. 15.

FIG. 15 is a view of the arrangement relation between the first hinge and the gauge line according to the second embodiment in plan view. FIG. 16 is a sectional view seen in the arrow direction along line XVI-XVI of FIG. 15. As illustrated in FIG. 15, a stretchable device 1G according to the second embodiment is the same as the first embodiment in that a gauge line 35G is included in the array layer 30 stacked on the first hinge 13. By contrast, as illustrated in FIG. 16, the stretchable device 1G according to the second embodiment is different from the first embodiment in that two gauge lines 35G (a first gauge line 135 and a second gauge line 235) are provided to one first hinge 13. As illustrated in FIG. 16, the stretchable device 1G according to the second embodiment is different from the first embodiment in that two signal lines 32G (132 and 232) are included in the array layer 30 stacked on the first hinge 13.

As illustrated in FIG. 16, the array layer 30 according to the second embodiment includes the first insulating layer 41, the second insulating layer 42, the third insulating layer 43, the fourth insulating layer 44, the fifth insulating layer 45, the sixth insulating layer 46, a seventh insulating layer 47, and an eighth insulating layer 48. The first gauge line 135 is stacked on the fourth insulating layer 44 of the array layer 30. The second gauge line 235 is stacked on the second insulating layer 42 of the array layer 30. Therefore, the first gauge line 135 and the second gauge line 235 are disposed in different insulating layers, and the first gauge line 135 is disposed higher.

As illustrated in FIG. 15, the first gauge line 135 and the second gauge line 235 have the same shape as that of the gauge line 35 according to the first embodiment in plan view. The second gauge line 235 overlaps the first gauge line 135, and it is not illustrated in FIG. 15, which is a plan view. The first gauge line 135 includes a first outward gauge portion 136 and a first return gauge portion 137. The second gauge line 235 includes a second outward gauge portion 236 and a second return gauge portion 237 (refer to FIG. 16).

The first gauge line 135 and the second gauge line 235 are disposed overlapping the inner peripheral region N in the same manner as the gauge line 35 according to the first embodiment. As illustrated in FIG. 16, the first gauge line 135 and the second gauge line 235 are stacked in the vertical direction and overlap each other. In other words, the distance from the center (virtual line K) in the width direction W of the first outward gauge portion 136 is equal to that of the second outward gauge portion 236. Similarly, the distance from the center (virtual line K) in the width direction W of the first return gauge portion 137 is equal to that of the second return gauge portion 237. With this configuration, when the first hinge 13 expands or contracts in the first direction Dx, the amount of strain generated in the first gauge line 135 is equal to that in the second gauge line 235.

Figure 17:
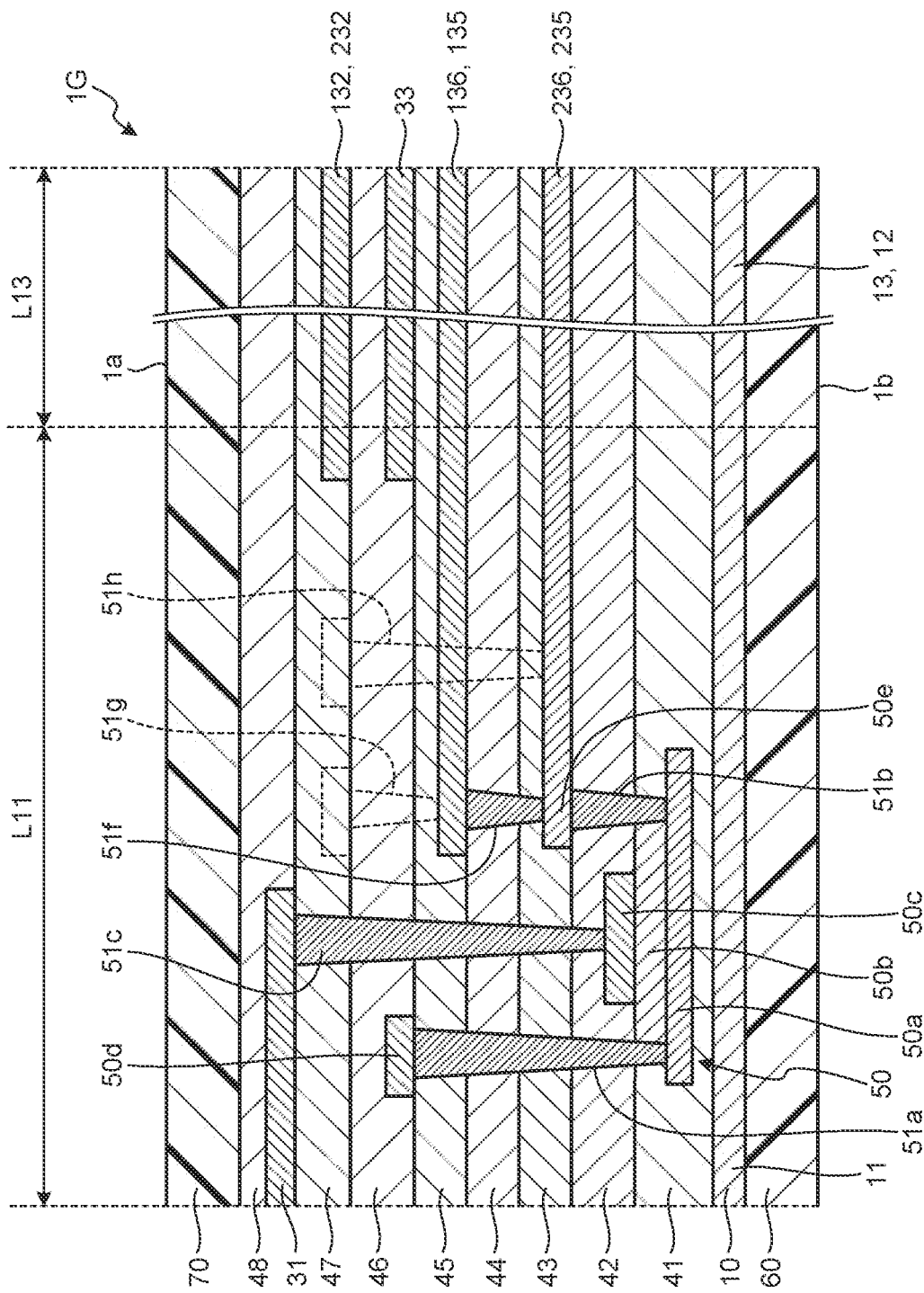
FIG. 17 is a sectional view of the sectional structure of the stretchable device according to the second embodiment.

FIG. 17 is a sectional view of the sectional structure of the stretchable device according to the second embodiment. As illustrated in FIG. 17, the source electrode 50e of the transistor 50 is stacked on the second insulating layer 42 and is coupled to the start point of the second outward gauge portion 236 (one end of the second gauge line 235). The source electrode 50e of the transistor 50 is coupled to the start point of the first outward gauge portion 136 (one end of the first gauge line 135) via a contact layer 51f.

As illustrated in FIG. 16, the first signal line 132 and the second signal line 232 are stacked on the sixth insulating layer 46. As illustrated in FIG. 17, the first signal line 132 is coupled to the end point (the other end of the first gauge line 135) of the first return gauge portion 137 (not illustrated in FIG. 17) via a contact layer 51g. The second signal line 232 is coupled to the end point of the second return gauge portion 237 (the other end of the second gauge line 235) via a contact layer 51h.

Figure 18:
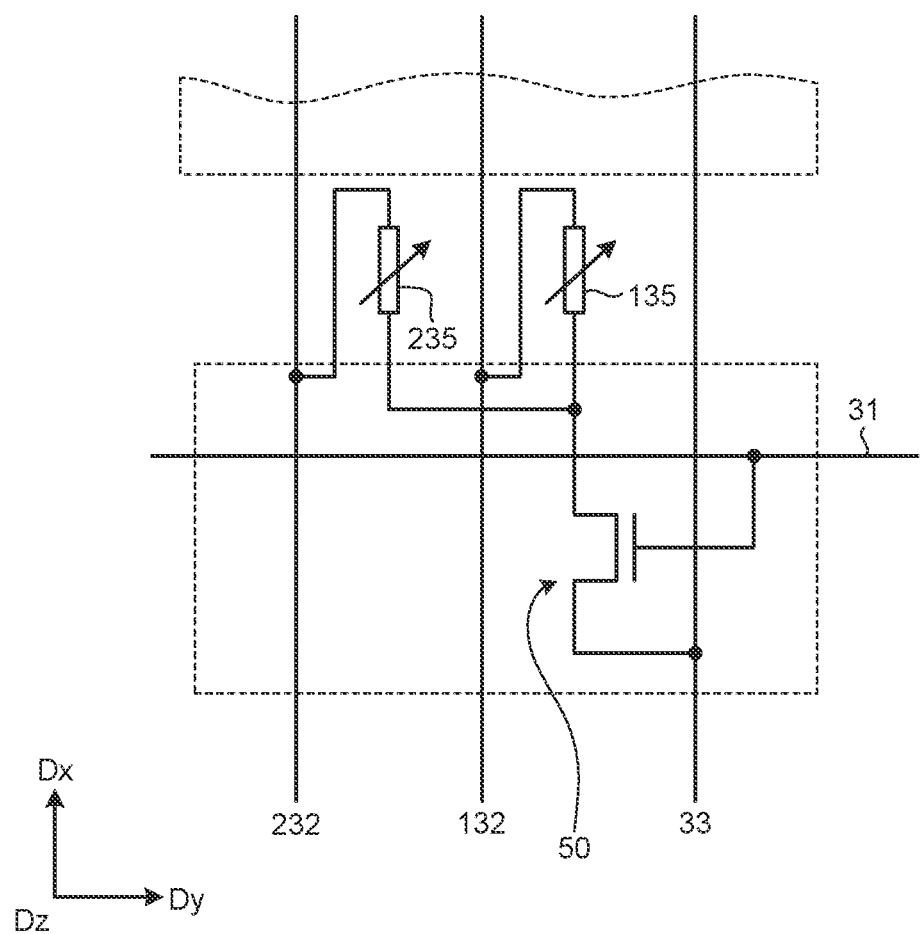
FIG. 18 is a circuit diagram of the circuit configuration of the stretchable device according to the second embodiment.

FIG. 18 is a circuit diagram of the circuit configuration of the stretchable device according to the second embodiment. As illustrated in FIG. 18, when a gate drive signal is transmitted to the gate line 31 in the second embodiment, the transistor 50 is turned ON. Subsequently, a predetermined amount of electric current flows from the current supply line 33 to the first gauge line 135 and the second gauge line 235 simultaneously. An electric current corresponding to the resistance of the first gauge line 135 is transmitted to the first signal line 132. An electric current corresponding to the resistance of the second gauge line 235 is transmitted to the second signal line 232.

When two gauge lines 35 are disposed overlapping each other in one hinge 12, the present disclosure may include two circuits according to the first embodiment (refer to FIG. 5) to obtain the resistance of the first gauge line 135 and the resistance of the second gauge line 235 separately. When two circuits according to the first embodiment are provided, however, the number of transistors 50 stacked on the body 11 increases. In addition, the electric current may possibly fail to be simultaneously applied to the first gauge line 135 and the second gauge line 235. The second embodiment, however, can simplify the layout of the array layer 30. The second embodiment is preferable because it can simultaneously detect the resistance of the first gauge line 135 and that of the second gauge line 235.

Figure 19:
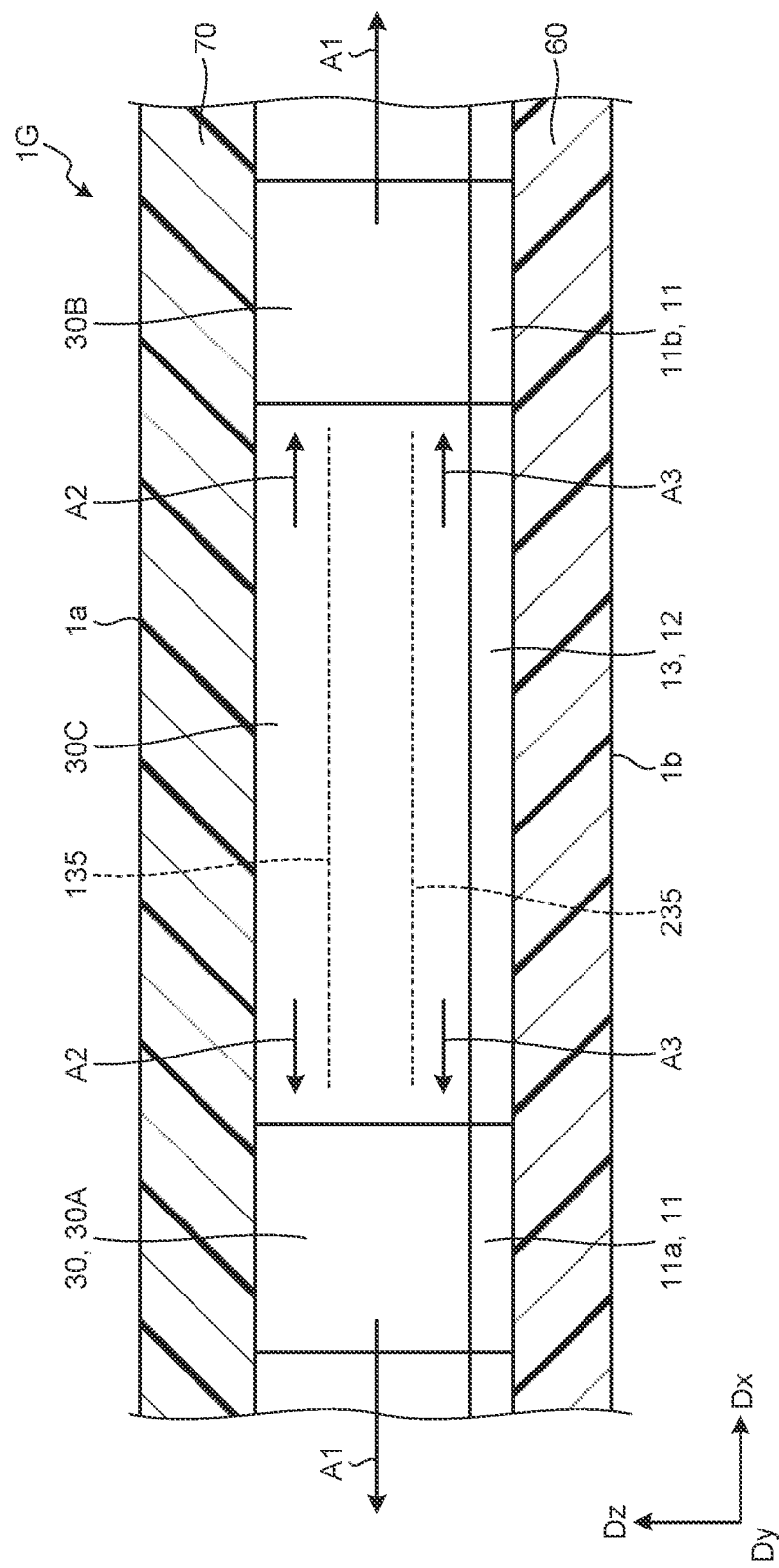
FIG. 19 is a schematic of the stretchable device viewed in the direction of arrow XIX of FIG. 15.
Figure 20:
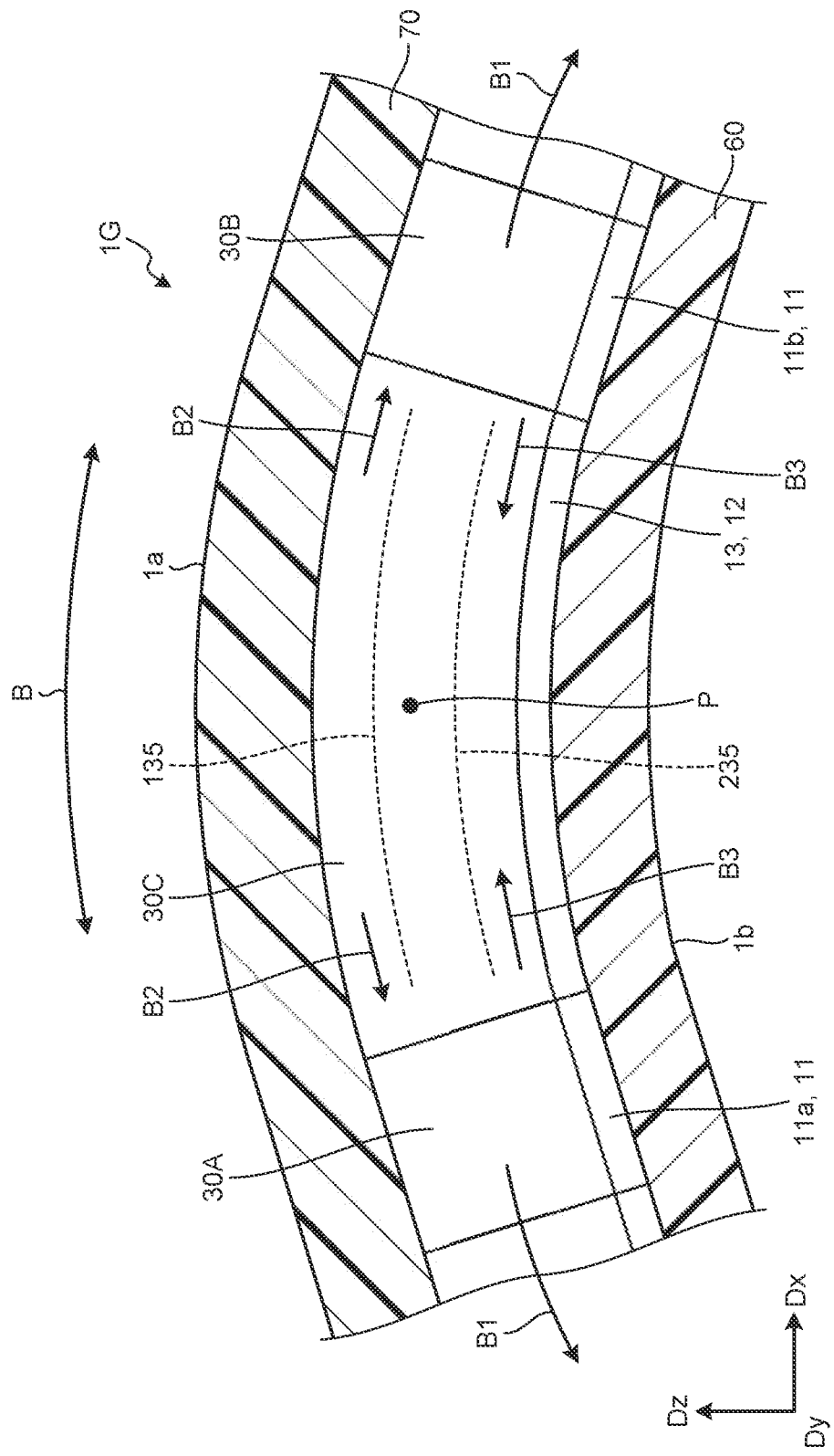
FIG. 20 is a schematic of the stretchable device when a bending load is applied.

FIG. 19 is a schematic of the stretchable device viewed in the direction of arrow XIX of FIG. 15. FIG. 20 is a schematic of the stretchable device when a bending load is applied. The following describes a case where the first hinge 13 is deformed due to a load acting on the stretchable device 1G. For the convenience of explanation, the array layer 30 stacked on the first body 11a is referred to as a first array layer 30A. The array layer 30 stacked on the second body 11b is referred to as a second array layer 30B. The array layer 30 stacked on the first hinge 13 is referred to as a third array layer 30C.

As illustrated in FIG. 19, when a tensile load in the first direction Dx acts on the stretchable device 1G, the first array layer 30A and the second array layer 30B receive loads that move the layers away from each other (refer to arrows A1 in FIG. 19). As a result, the third array layer 30C deforms to stretch in the first direction Dx. In other words, the first gauge line 135 and the second gauge line 235 included in the third array layer 30C stretch in the first direction Dx (refer to arrows A2 and A3). The amount of strain generated in the first gauge line 135 is equal to that in the second gauge line 235.

As illustrated in FIG. 20, when a bending load B centered on a virtual line P extending in the second direction Dy acts on the stretchable device 1G, the stretchable device 1G bends. The first array layer 30A and the second array layer 30B receive downward loads that move the layers away from each other (refer to arrows B1 in FIG. 20).

As a result, the third array layer 30C bends when viewed in the second direction Dy. A tensile load in the first direction Dx (refer to arrows B2 in FIG. 20) acts on the layers of the third array layer 30C closer to the second resin plate 70. By contrast, a compressive load in the first direction Dx (refer to arrows B3 in FIG. 20) acts on the layers of the third array layer 30C closer to the first resin plate 60. As a result, the first gauge line 135 stretches in the first direction Dx, and the second gauge line 235 contracts in the first direction Dx. Therefore, the direction and the amount of strain generated in the first gauge line 135 are different from those of the second gauge line 235.

While the above has described the tensile load and the bending load separately, both tensile and bending loads may possibly act on the stretchable device 1G. In such a case, both the first gauge line 135 and the second gauge line 235 are deformed to stretch in the first direction Dx, but the amounts of deformation (strain) are different.

Figure 21:
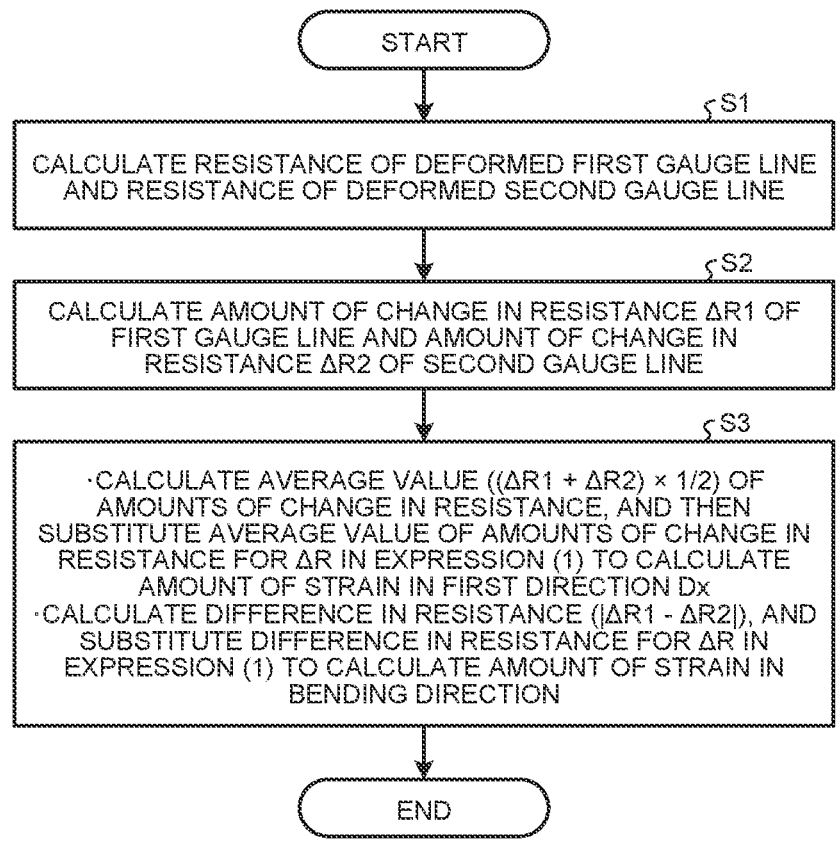
FIG. 21 is a flowchart of a process performed after receiving detection results (electrical signals) in the stretchable device according to the second embodiment.

FIG. 21 is a flowchart of a process performed after receiving detection results (electrical signals) in the stretchable device according to the second embodiment. The following describes the process performed by the drive IC when receiving electrical signals from the first signal line 132 and the second signal line 232.

When the drive IC obtains detection results (current values) from the first signal line 132 and the second signal line 232 (Start), the drive IC performs the processing at Step S1.

At Step S1, the drive IC calculates the resistance of the deformed first gauge line 135 and the resistance of the deformed second gauge line 235 from the detection results (electrical signals) of the first gauge line 135 and the second gauge line 235.

At Step S2, the drive IC calculates the amount of change in resistance ΔR1 of the first gauge line 135 and the amount of change in resistance ΔR2 of the second gauge line 235 from the calculated resistance values.

At Step S3, the drive IC calculates an average value ((ΔR1+ΔR2)×½) of the amount of change in resistance ΔR1 of the first gauge line 135 and the amount of change in resistance ΔR2 of the second gauge line 235. The drive IC substitutes the average value ((ΔR1+ΔR2)×½) of the amounts of change in resistance for ΔR in Expression (1) to calculate the amount of strain in the first direction Dx (amount of strain due to the expansion and contraction load).

At step S3, the drive IC calculates the difference in resistance (|ΔR1−ΔR2|) between the first gauge line 135 and the second gauge line 235. Subsequently, the drive IC substitutes the difference in resistance (|ΔR1−ΔR2|) for ΔR in Expression (1) to calculate the amount of strain in the bending direction (amount of strain due to the bending load), and ends the process (End).

As described above, the stretchable device 1G according to the second embodiment can perform multi-point detection and detect the amount of strain corresponding to an expansion and contraction load and the amount of strain corresponding to a bending load.

The above has described the first embodiment, the modifications thereof, and the second embodiment. The following describes modifications of the circuit configuration.

Seventh Modification

Figure 22:
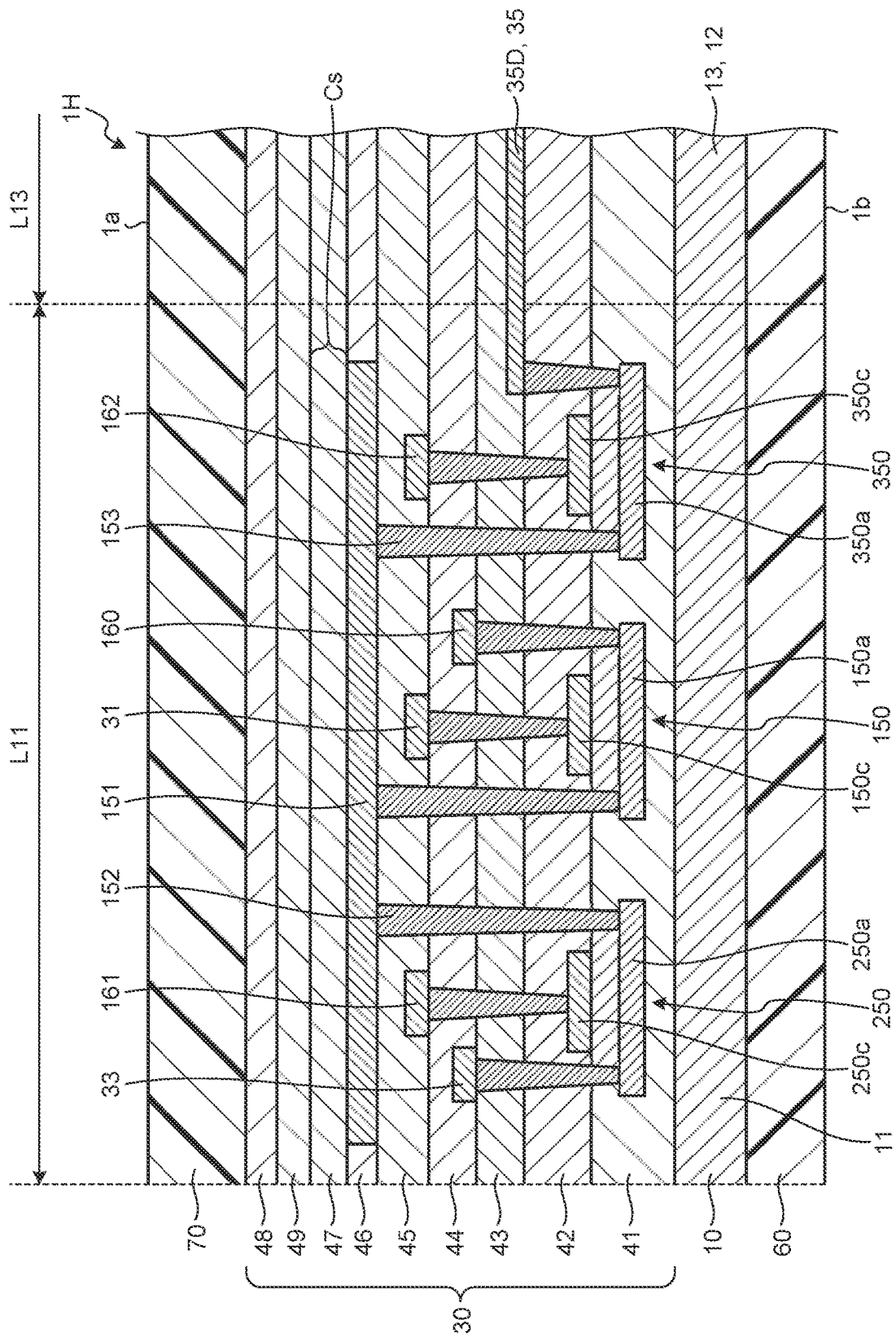
FIG. 22 is a sectional view of the stretchable device according to a seventh modification.
Figure 23:
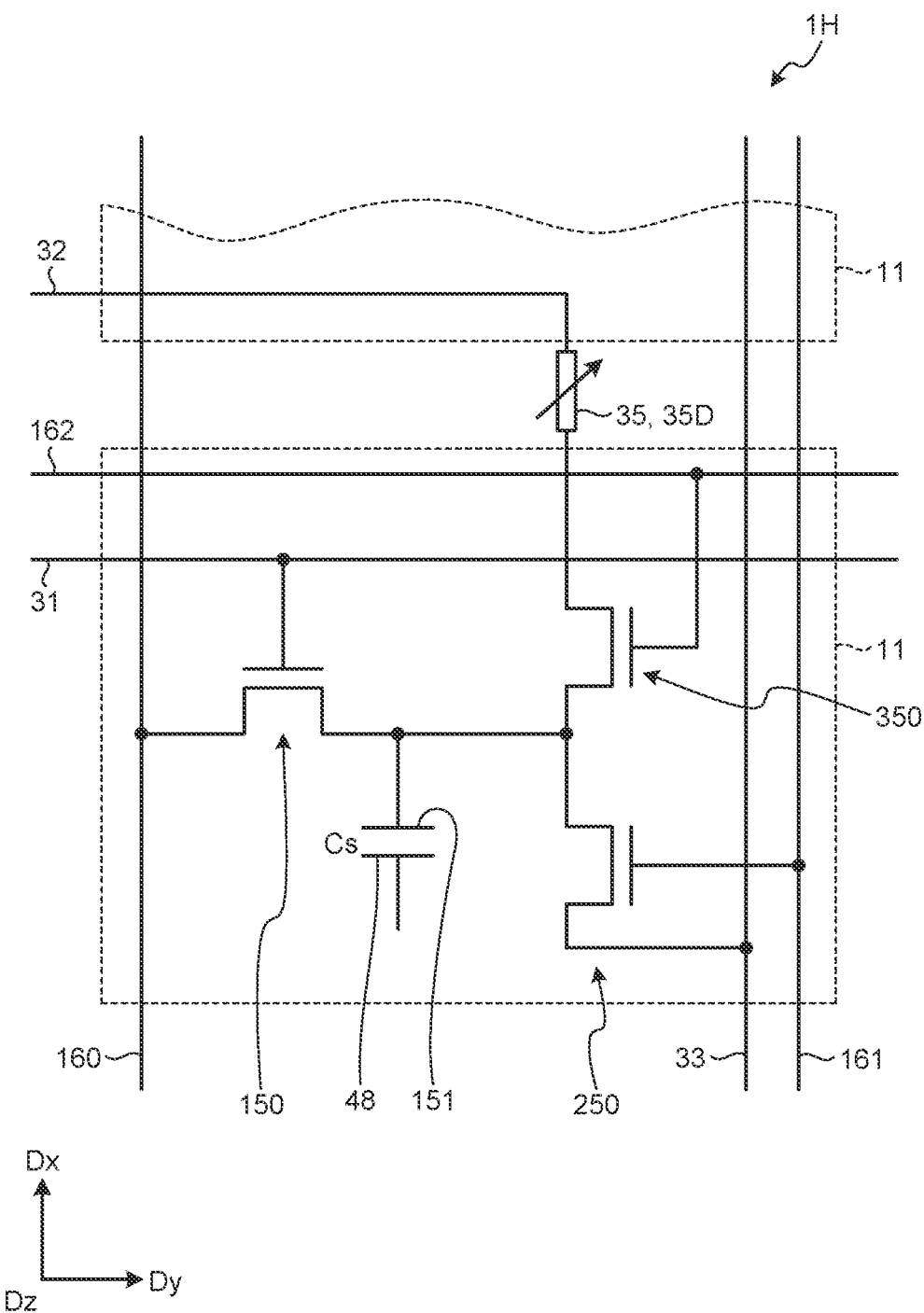
FIG. 23 is a circuit diagram of the stretchable device according to the seventh modification.
Figure 24:
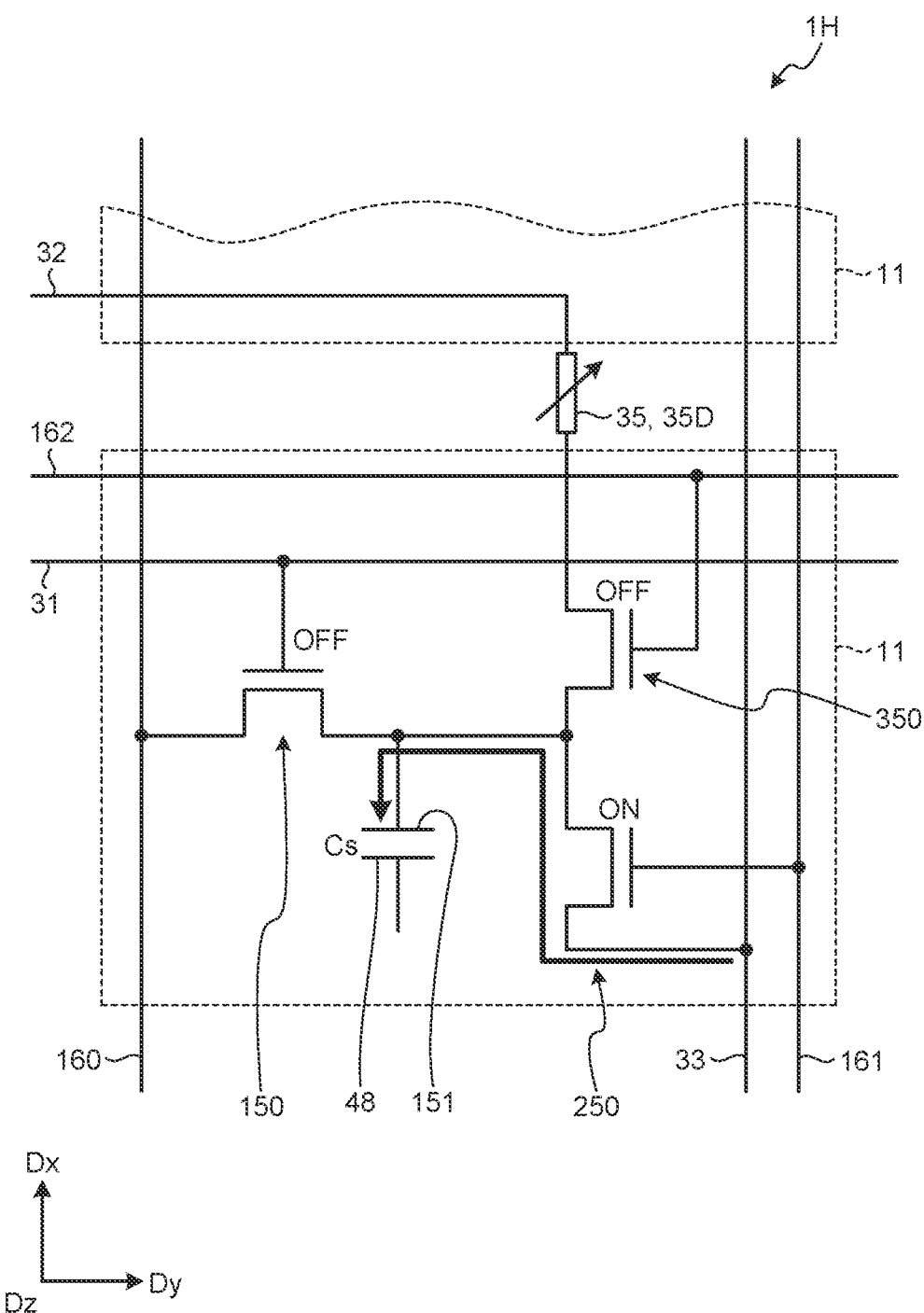
FIG. 24 is a diagram of a first operation in the circuit diagram according to the seventh modification.
Figure 25:
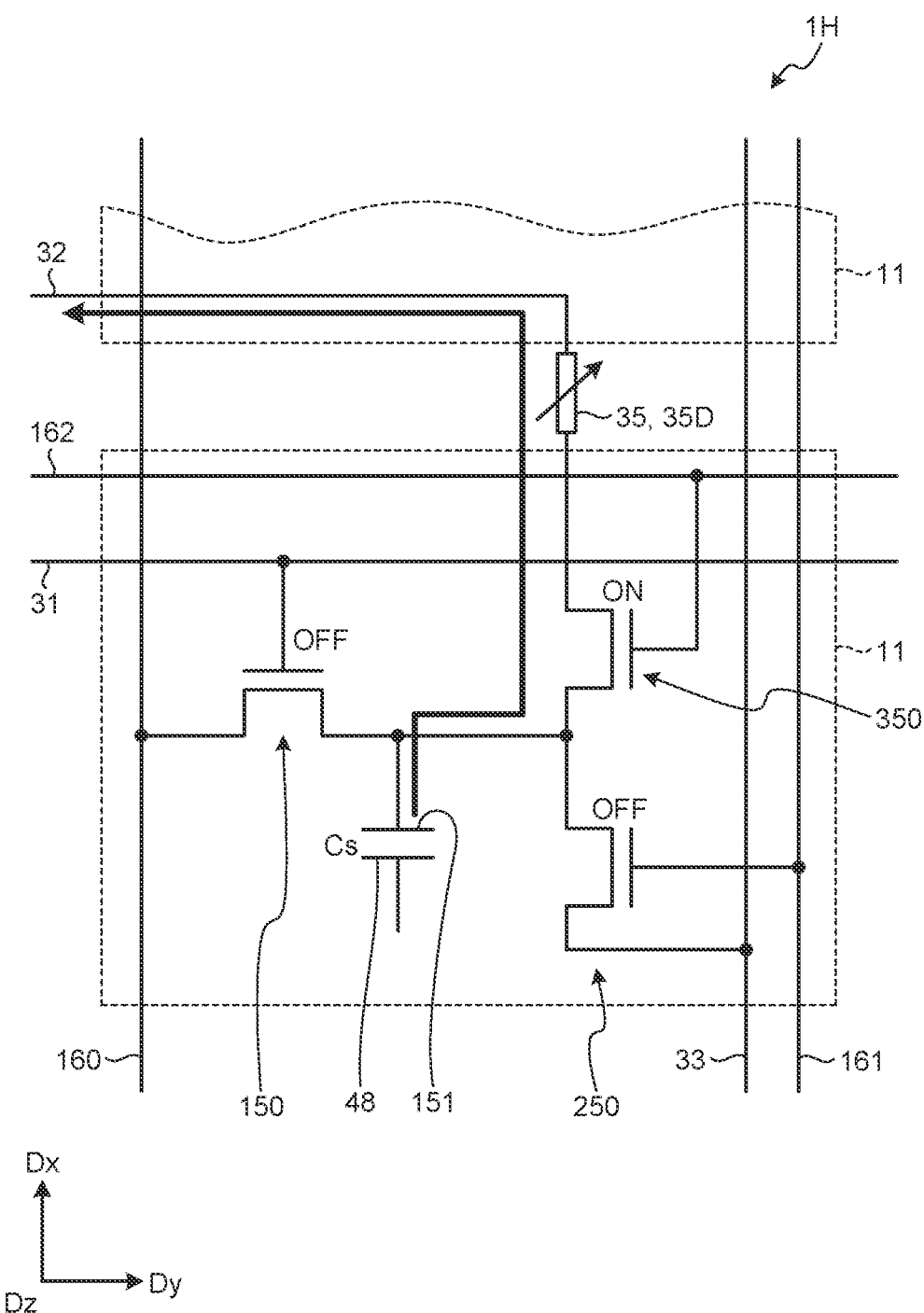
FIG. 25 is a diagram of a second operation in the circuit diagram according to the seventh modification.
Figure 26:
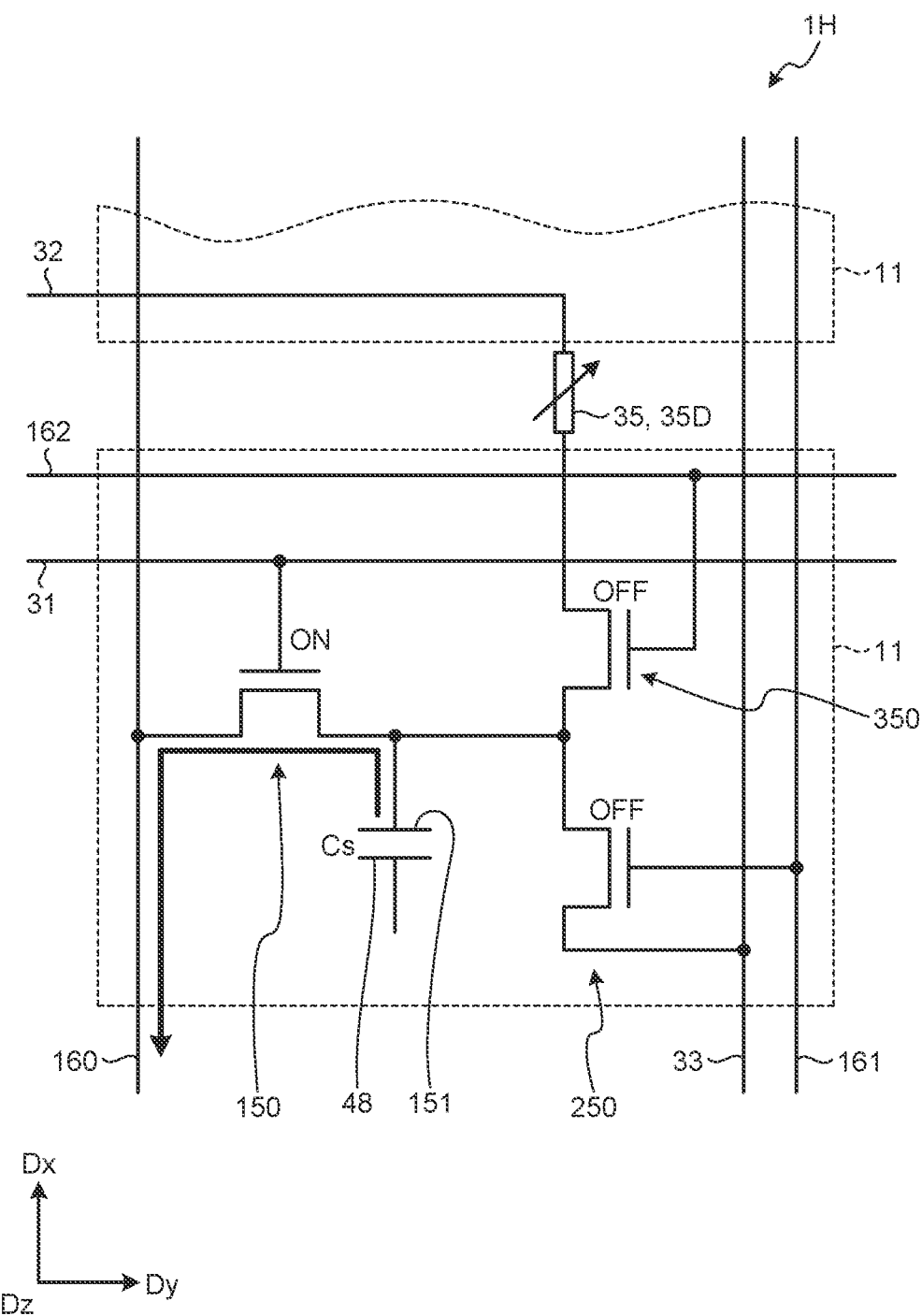
FIG. 26 is a diagram of a third operation in the circuit diagram according to the seventh modification.

FIG. 22 is a sectional view of the stretchable device according to a seventh modification. FIG. 23 is a circuit diagram of the stretchable device according to the seventh modification. FIG. 24 is a diagram of a first operation in the circuit diagram according to the seventh modification. FIG. 25 is a diagram of a second operation in the circuit diagram according to the seventh modification. FIG. 26 is a diagram of a third operation in the circuit diagram according to the seventh modification.

In a stretchable device 1H according to the seventh modification, the gauge lines 35 are included only in the array layer 30 stacked on the first hinges 13. The gauge line 35 is the gauge line 35D according to the fourth modification, which is composed of one wiring line.

As illustrated in FIG. 22, the array layer 30 includes the first insulating layer 41, the second insulating layer 42, the third insulating layer 43, the fourth insulating layer 44, the fifth insulating layer 45, the sixth insulating layer 46, the seventh insulating layer 47, a common electrode 49, and the eighth insulating layer 48 stacked in order on the resin base member 10. The common electrode 49 is a solid film formed over the entire detection region 2. The array layer 30 stacked on the body 11 includes a first transistor 150, a second transistor 250, and a third transistor 350.

As illustrated in FIGS. 22 and 23, a gate electrode 150c of the first transistor 150 is coupled to the gate line 31. Reset wiring 160 is coupled to the drain electrode side of the first transistor 150, and a shared electrode 151 is coupled to the source electrode side thereof.

The shared electrode 151 is formed above the first transistor 150, the second transistor 250, and the third transistor 350. The shared electrode 151 is coupled to a semiconductor layer 250a of the second transistor 250 and a semiconductor layer 350a of the third transistor 350 via contact layers 152 and 153, respectively. Thus, the shared electrode 151 is shared by the first transistor 150, the second transistor 250, and the third transistor 350. The shared electrode 151 faces the common electrode 49 with the seventh insulating layer 47 interposed therebetween. The common electrode 49 is supplied with a predetermined potential, and the shared electrode 151 and the common electrode 49 cooperate to serve as a capacitor Cs.

A gate electrode 250c of the second transistor 250 is coupled to a charging start signal line 161. The current supply line 33 is coupled to the drain electrode side of the second transistor 250. A gate electrode 350c of the third transistor 350 is coupled to a detection start signal line 162. One end of the gauge line 35D is coupled to the drain electrode side of the third transistor 350. As illustrated in FIG. 23, the other end of the gauge line 35D is coupled to the signal line 32 stacked on the adjacent body 11. In the seventh modification, the signal lines 32 are provided for the respective gauge lines 35D.

The following describes an example of the operation according to the seventh modification. As illustrated in FIG. 24, a charging start signal is transmitted to the charging start signal line 161 first. Thus, the second transistor 250 is turned ON, and a predetermined amount of electric current flows from the current supply line 33 to the shared electrode 151 (refer to the arrow in FIG. 24). As a result, a predetermined amount of electric charge is accumulated in the capacitor Cs.

Subsequently, a detection start signal is transmitted to the charging start signal line 161. As illustrated in FIG. 25, the third transistor 350 is turned ON, and the electric charge accumulated in the capacitor Cs passes through the gauge line 35D and flows to the signal line 32 (refer to the arrow in FIG. 25). As a result, an electric current corresponding to the resistance of the gauge line 35D flows to the signal line 32, and the resistance of the deformed gauge line 35D is detected.

Subsequently, a reset signal is transmitted to the gate line 31. As illustrated in FIG. 26, the first transistor 150 is turned ON, and the electric charge remaining in the capacitor Cs is transmitted to the reset wiring 160 to reset the charging of the capacitor Cs (the electric charge is zero).

The above has described the stretchable device 1H according to the seventh modification. While the gauge lines 35 are included only in the array layer 30 stacked on the first hinges 13 in the seventh modification, the gauge lines 35 may be included in the array layer 30 stacked on the first hinges 13 and the second hinges 14. If such two types of gauge lines 35 are provided, the stretchable device may include two circuit configurations described in the seventh modification. Alternatively, the stretchable device may include the circuit configuration described in an eighth modification or a ninth modification.

Eighth Modification

Figure 27:
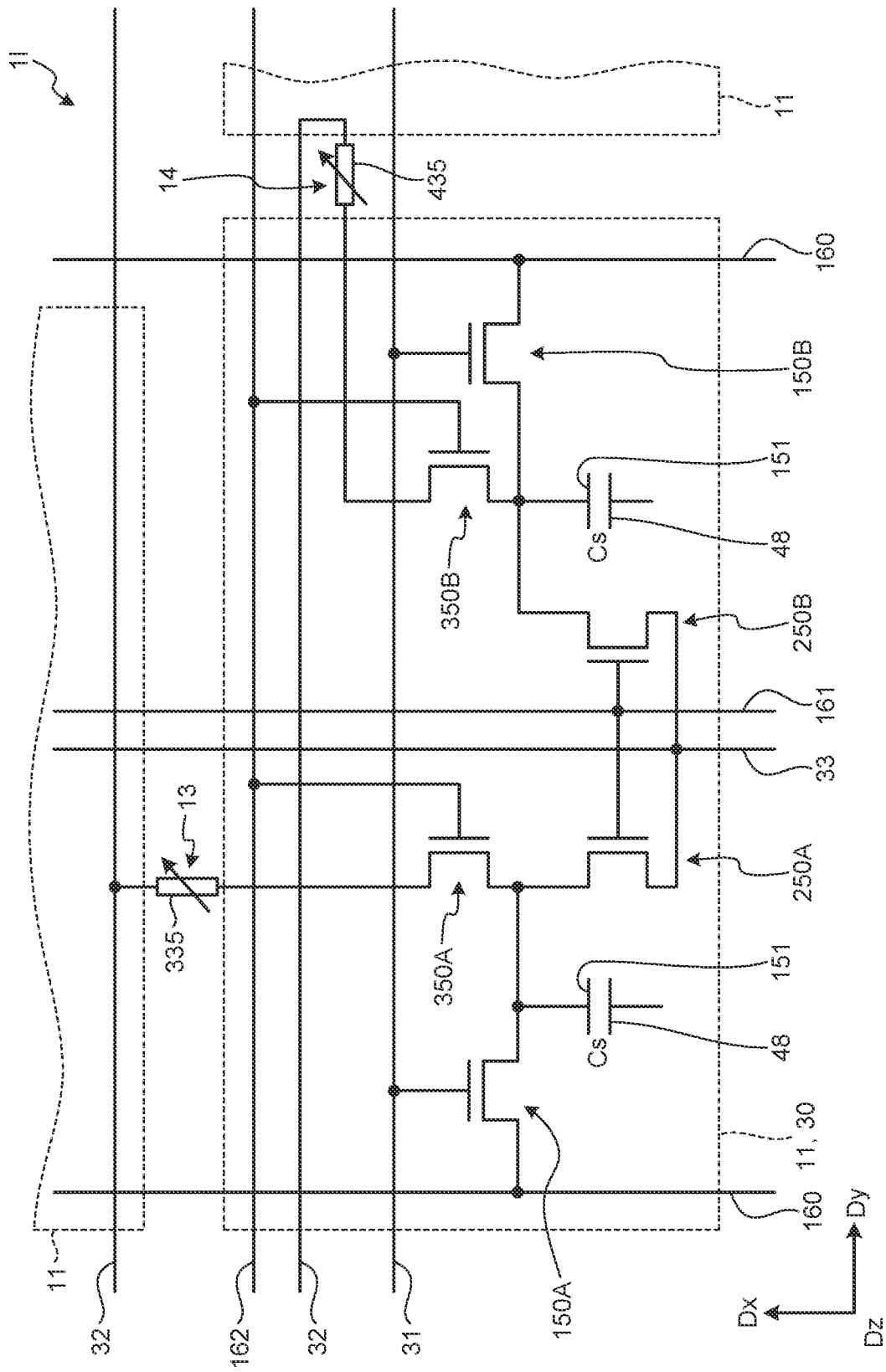
FIG. 27 is a circuit diagram of the stretchable device according to an eighth modification.

FIG. 27 is a circuit diagram of the stretchable device according to the eighth modification. As illustrated in FIG. 27, in a stretchable device 1I according to the eighth modification, a first gauge line 335 is included in the array layer 30 stacked on the first hinge 13, and a second gauge line 435 is included in the array layer 30 stacked on the second hinge 14. Both the first gauge line 335 and the second gauge line 435 are the gauge line 35D according to the fourth modification composed of one wiring line.

The array layer 30 stacked on the body 11 includes three transistors (a first transistor 150A, a second transistor 250A, and a third transistor 350A) for detecting the resistance of the first gauge line 335, three transistors (a first transistor 150B, a second transistor 250B, and a third transistor 350B) for detecting the resistance of the second gauge line 435, and various kinds of wiring for driving the transistors.

The three transistors (the first transistor 150A, the second transistor 250A, and the third transistor 350A) and the three transistors (the first transistor 150B, the second transistor 250B, and the third transistor 350B) that detect the resistance of the second gauge line 435 of the second hinge 14 have the same circuit configuration as that of the seventh modification, and thus the detailed description thereof is omitted.

In the eighth modification, the gate electrodes of the respective second transistors 250A and 250B are coupled to the charging start signal line 161 common thereto. The source electrode sides (or drain electrode sides) of the respective second transistors 250A and 250B are coupled to the current supply line 33 common thereto. The gate electrodes of the respective third transistors 350A and 350B are coupled to the detection start signal line 162 common thereto.

In the eighth modification, the charging start signal line 161, the current supply line 33, and the detection start signal line 162 are shared. Therefore, the eighth modification requires a fewer number of wiring lines than in a case where two circuit configurations described in the seventh modification are provided without any change. In addition, an electric current can be simultaneously applied to the first gauge line 335 and the second gauge line 435.

Ninth Modification

Figure 28:
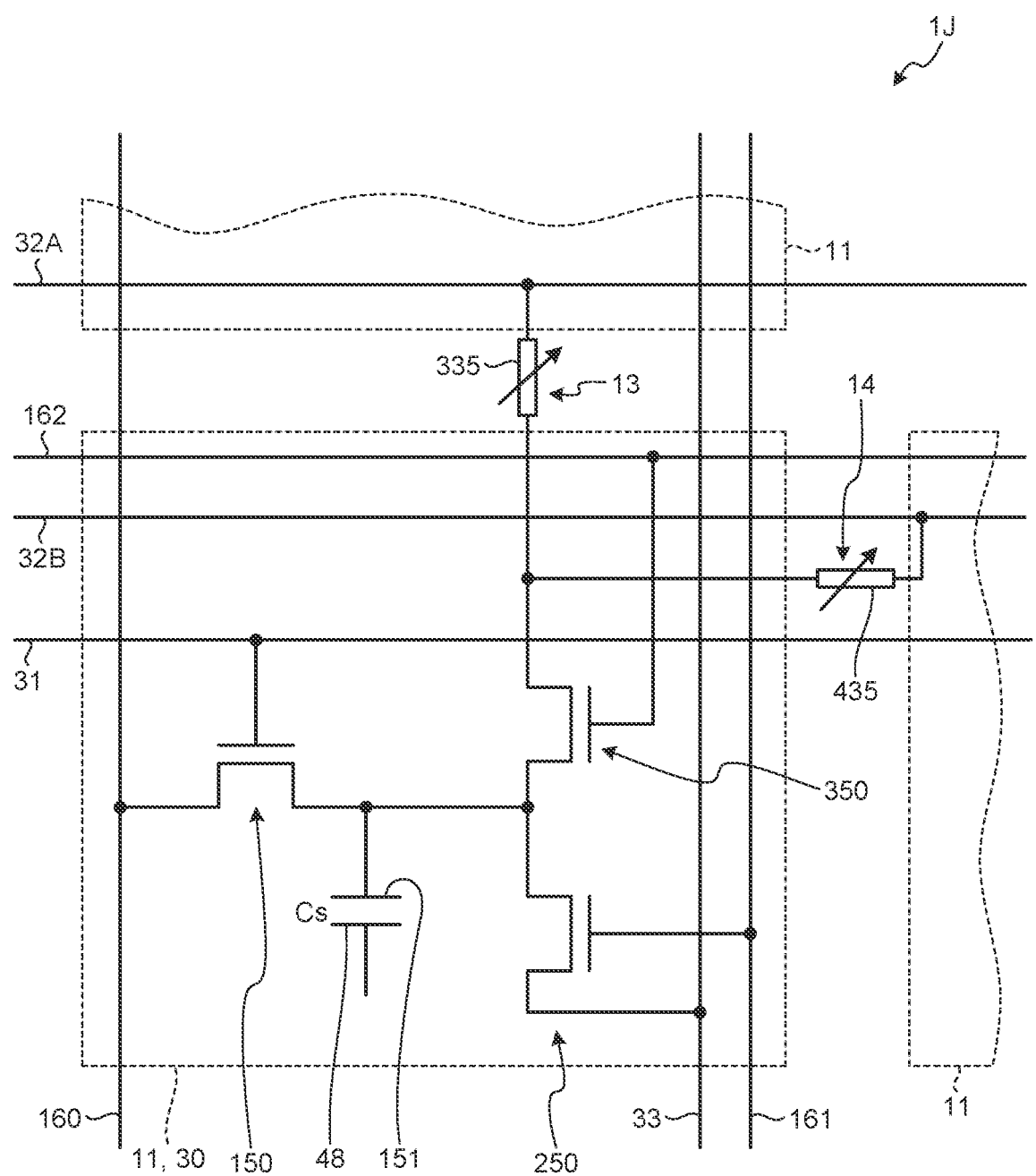
FIG. 28 is a circuit diagram of the stretchable device according to a ninth modification.

FIG. 28 is a circuit diagram of the stretchable device according to the ninth modification. As illustrated in FIG. 28, a stretchable device 1J according to the ninth modification includes the three transistors (the first transistor 150, the second transistor 250, and the third transistor 350) described in the seventh modification. The drain electrode side (source electrode side) of the third transistor 350 is coupled to the first gauge line 335 and the second gauge line 435.

When the third transistor 350 is turned ON, the electric charge accumulated in the capacitor Cs simultaneously flows to the first gauge line 335 and the second gauge line 435. An electric current corresponding to the resistance of the first gauge line 335 flows to a signal line 32A. An electric current corresponding to the resistance of the second gauge line 435 flows to a signal line 32B. Therefore, the resistance of the first gauge line 335 and the second gauge line 435 can be detected. In addition, the ninth modification requires a fewer number of transistors than in the case of the circuit diagram according to the eighth modification.

What is claimed is:

1. A stretchable device comprising:
a resin base member; and
an array layer stacked on the resin base member, wherein
the resin base member comprises:
  a plurality of bodies disposed in a manner separated from each other; and
  a plurality of hinges that couple the bodies,
each of the hinges includes a plurality of bends bending when viewed in a stacking direction in which the resin base member and the array layer are stacked,
each of the bends is divided into an inner peripheral portion positioned on an inner side and an outer peripheral portion positioned on an outer side with respect to a center serving as a boundary in a width direction intersecting a direction in which the bend extends,
a plurality of the inner peripheral portions included in one of the hinges constitute an inner peripheral region,
a plurality of the outer peripheral portions included in one of the hinges constitute an outer peripheral region,
the array layer includes a plurality of gauge lines overlapping the respective hinges when viewed in the stacking direction,
when viewed in the stacking direction:
  one of the gauge lines overlaps the inner peripheral region of a corresponding one of the hinges without overlapping the outer peripheral region of the corresponding one of the hinges, or
  one of the gauge lines overlaps the outer peripheral region of a corresponding one of the hinges without overlapping the inner peripheral region of the corresponding one of the hinges.

2. The stretchable device according to claim 1, wherein each of the gauge lines that overlaps all the inner peripheral portions included in the inner peripheral region of the corresponding one of the hinges, and overlaps none of the outer peripheral portions included in the outer peripheral region of the corresponding one of the hinges, when viewed in the stacking direction.

3. The stretchable device according to claim 1, wherein each of the gauge lines that overlaps all the outer peripheral portions included in the outer peripheral region of the corresponding one of the hinges, and overlaps none of the inner peripheral portions included in the inner peripheral region of the corresponding one of the hinges, when viewed in the stacking direction.

4. The stretchable device according to claim 1, wherein each of the gauge lines has a U-shape of extending from a first end to a second end of the hinge, turning around at the second end of the hinge, and extending to the first end of the hinge.

5. The stretchable device according to claim 1, wherein each of the gauge lines has a folded portion at the inner peripheral portion or the outer peripheral portion with which each of the gauge lines overlaps, the folded portion being folded back from a first side to a second side in the direction in which the bend extends and folded back again from the second side to the first side in the direction in which the bend extends.

6. The stretchable device according to claim 1, wherein each of the gauge lines comprises a first gauge line and a second gauge line overlapping in the stacking direction.

* * * * *